Patented Nov. 24, 1936

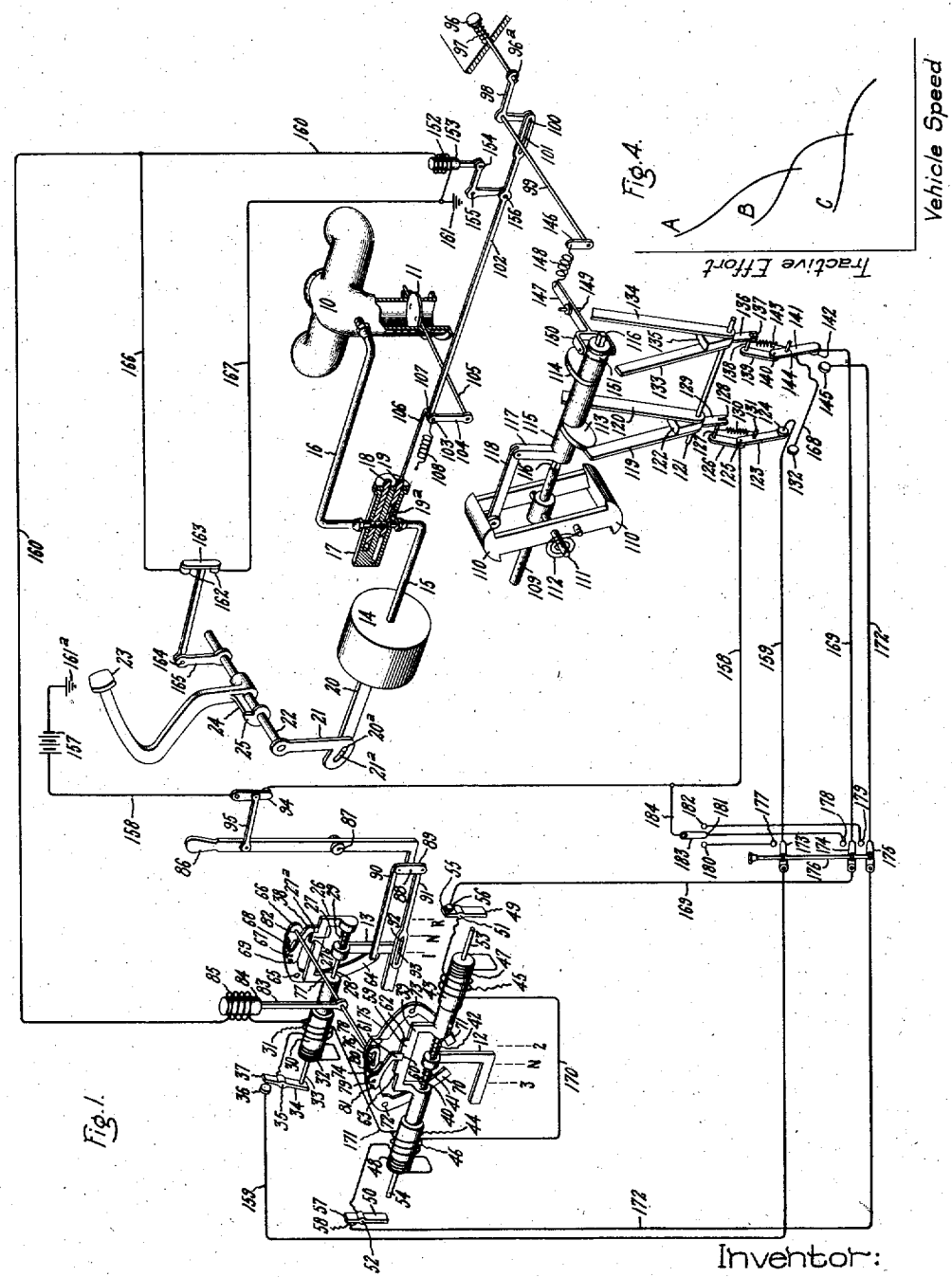

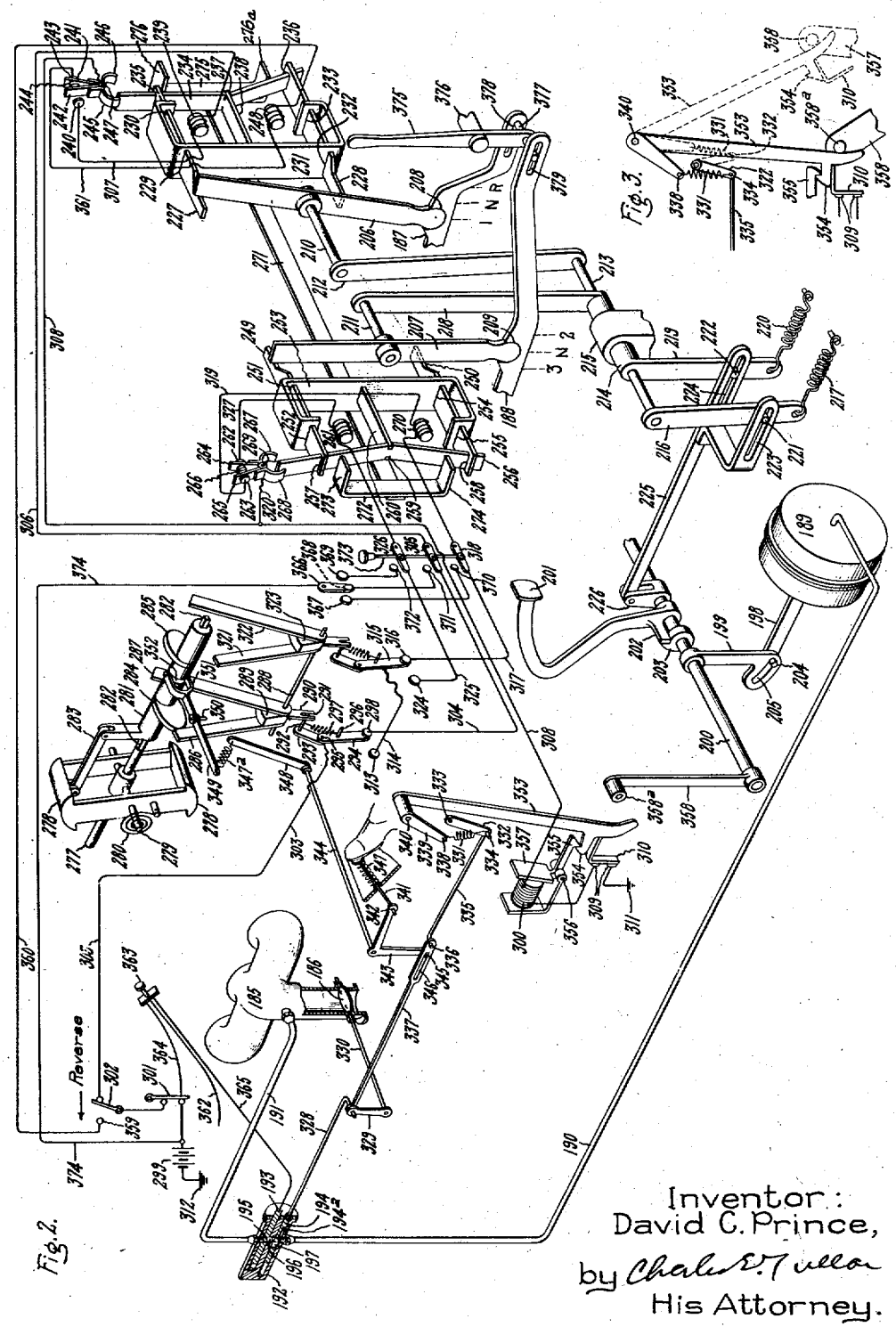

2,062,104

UNITED STATES PATENT OFFICE 2,062,104

POWER SYSTEM

David C. Prince, Swarthmore, Pa., assignor to General Electric Company, a corporation of New York Application January 18, 1933, Serial No. 652,411

44 Claims. (Cl. 192—.01)

My invention relates to power systems, and more particularly to a system of this type in which a prime mover drives a load through a speed changing mechanism, and the speed ratio of the speed changing mechanism is automatically controlled.

Many prime movers produce substantially constant torque, so that the power developed thereby at low speeds is greatly diminished. If, therefore, it is desired to drive a load at low speed, or near standstill, it is necessary to connect these prime movers to the load through a speed changing mechanism, or transmission, having a sufficient range of speed reduction to apply torque to the load at low speed and permit the prime mover to run at, or within a speed range, high enough to develop sufficient power to drive the load. The speed of the load at which the ratio of the speed changing mechanism should be changed varies widely depending upon the torque developed by the prime mover and the rate of acceleration of the load desired. For this reason, even the most skilled operator finds it difficult to coordinate the change in ratio of the speed changing mechanism with the operation of the prime mover and the load, so as to obtain the maximum performance from the prime mover.

Power systems of this type are commonly used in vehicles, such as automobiles, and the change in ratio of the speed changing mechanism connecting the engine to the driving wheels is accomplished manually by the operator. The change in ratio of the speed changing, or gear shifting mechanism, employed should be closely coordinated with the speed of the vehicle and the tractive effort developed by the engine, to obtain the maximum rate of acceleration of the vehicle and a maximum performance of the engine. In starting the vehicle if the gears are shifted from one speed to another before the vehicle has attained a particular speed at which the tractive effort is the same in both speeds, the shifting will produce a sudden decrease in the tractive effort and a resulting reduction in the rate of acceleration of the vehicle. On the other hand, if the gears are shifted after the vehicle has attained a speed at which the tractive effort developed is the same in the two speeds, the tractive effort will decrease until the gears are shifted when there will be an increase in the tractive effort of the vehicle. If there is any long delay in shifting the gears until after the tractive effort is the same in both speeds, the tractive effort of the vehicle will be reduced during the interval, from the time when the tractive effort would be the same in both speeds until the gears are shifted, so that a decrease in the rate of acceleration of the vehicle will occur during this interval. The best results are obtained when the tractive effort developed in any particular speed in starting is slightly less than the tractive effort developed in the succeeding speed. The failure to coordinate the shifting of the gears with the speed of the vehicle and the tractive effort not only decreases the rate of acceleration of the vehicle, but also may result in overspeeding the engine, or operating the engine so that it develops high torque at very low speed, both of which produce excessive wear on the engine.

The actual characteristics of the internal combustion engine are not understood by most operators of vehicles, so that they have considerable difficulty in selecting the proper gear to use under any particular set of conditions. Most operators hesitate to change gears unless forced to do so and, as a result, secure from the vehicles a performance very inferior to that of which they are capable in skilled hands.

The internal combustion engine produces substantially constant torque for a given throttle setting over a wide range of speed. At some maximum speed the torque decreases and the maximum power which can be delivered is near this maximum speed. By shifting the gears the mechanical advantage of the engine is altered, with the result, that in any low or intermediate gear considerably more torque is available to drive the wheels, but in some lower gear the engine reaches the number of revolutions corresponding to the maximum output and beyond this value, less effective effort may be obtained in the lower than in the higher gear for maximum acceleration. In order to obtain the best results the first and second gear should remain engaged until the tractive effort at this speed decreases to a value approximately equal to the tractive effort obtainable in the next succeeding gear combination at the particular speed of the vehicle.

It has been proposed, heretofore, to automatically control the shifting of gears in an automobile, or similar power system, in accordance with the speed of the vehicle, or the speed of the load driven by the prime mover. Systems of this type are subject to the disadvantage that they are capable of shifting the gears at only one relation of torque or tractive effort and speed of the load, whereas it is necessary to shift the gears at different load speeds depending upon the load conditions.

An object of my invention is to provide a power system having a prime mover connected to a load through a speed changing mechanism in which the ratio of the speed changing mechanism is coordinated with the speed of the load under various load conditions to produce maximum acceleration of the load, and to effectively utilize the power output of the prime mover.

I accomplish this by providing a power system including a prime mover having an arrangement for controlling the torque exerted by the prime mover, a driven member, a speed changing mechanism for connecting the driven member to the prime mover, and an arrangement responsive to the torque controlling means and the speed of the driven member for controlling the speed changing mechanism.

Further objects and advantages of my invention will become apparent as the following description proceeds, and the features of novelty which characterize my invention will be pointed out with particularity in the claims annexed to and forming a part of this specification.

Fig. 1 is a diagrammatic view of a power system of an automobile embodying my invention; Fig. 2 is a diagrammatic view of another power system of an automobile embodying my invention; Fig. 3 is a side elevation of the spring and lever arrangement, which I employ for controlling the throttle and the speed changing mechanism in the power system shown in Fig. 2; and Fig. 4 is a tractive effort-vehicle speed curve of an automobile in first, second, and third speeds with fully open throttle.

Referring to the drawings, the embodiment of my invention shown in Fig. 1 is a power system for an automobile having an internal combustion engine provided with an intake manifold 10 through which a combustible mixture is supplied from a carburetor to the engine cylinders. The torque produced by the engine is controlled by the opening and closing of the throttle valve 11, which in its closed position shown in the drawings, permits a sufficient flow of combustible mixture to operate the engine at idling speed. The engine is connected to the driving wheels of the automobile through a clutch and speed changing, or gear shifting mechanism, having shifter bars 12 and 13 for moving the gears of the gear shifting mechanism to a neutral or a gear engaging position. The clutch connecting the engine and the speed changing mechanism is biased in the usual way to a position in which the clutch is engaged, and a power device 14 is provided for engaging and disengaging the clutch.

The gear shifting mechanism is electrically responsive to actuate the shifter bars 12 and 13 from their neutral to their gear engaging positions, and is controlled by a centrifugal switch responsive to the speed of a driven member connecting the speed changing or gear shifting mechanism to the driving wheels of the vehicle. The particular speed of the driven member at which the electrically responsive gear shifting mechanism is actuated to shift the gears is modified by a spring, or other suitable arrangement, in accordance with the movement of the throttle controlling lever of the vehicle. This arrangement modifies the response of the gear shifting mechanism to the speed of the driven member without interrupting the operation of the centrifugal switch. In the interval during which the gears are shifted the throttle is automatically closed and the clutch disengaged, and after the gears are shifted the throttle is released, so that it can open and be controlled by its controlling lever, and the clutch engaged. In this way the shifting of the gears of the vehicle is coordinated with the speed of the vehicle and the actuation of the throttle controlling lever in such manner as to produce maximum acceleration of the vehicle for any particular throttle opening, and obtain the most satisfactory performance of the vehicle, without any attention on the part of the operator.

The power device 14 which engages and disengages the clutch is of the vacuum controlled type and is connected to the intake manifold 10 of the engine by pipes 15 and 16 and a double valve 17 having plungers 18 and 19. When the plungers 18 and 19 of the valve 17 are in the position shown in the drawings the openings therein are in alinement with the passages through the valve, so that the valve 17 is open, and the low pressure existing in the intake manifold 10 reduces the pressure in the power device 14. A diaphragm or piston in the power device then retracts a link 20 and disengages the clutch. Movement of either of the plungers 18 or 19 to a position in which the openings therein are out of alinement with the passage 17, cuts off communication through the pipes 15 and 16 between the power device 14 and manifold 10 and vents the power device through a slot 19a, so that the pressure in the power device rises and the link 20 is extended away from the power device 14 to engage the clutch. This retraction of the link 20 disengages the clutch as it is connected to the controlling lever thereof through arm 21 and a rocking shaft 22, which is supported in suitable bearings. A clutch pedal 23 is loosely mounted on the shaft 22 and is provided with a projection 24 engaging an abutment 25 on a collar secured to the shaft 22. The link 20 is secured to the arm 21 by a pin 20a arranged in a slot 21a, so that the clutch pedal 23 can be actuated to disengage and engage the clutch independently of the power device 14.

In this embodiment of my invention the shifter bars 12 and 13 are actuated by an electrically responsive gear shifting mechanism which successively moves the shifter bars to a neutral position, and then to the desired gear engaging position, the construction being arranged to latch the shifter bars in the neutral and gear engaging positions and simultaneously deenergize the gear shifting mechanism. This construction includes a yoke 26 having a projection 27 on the upper portion thereof and a guide-rod 28 secured thereto, which is slidably arranged in an opening in the upper end of the shifter bar 13 and extends parallel to the direction of movement of the shifter bar 13 from its neutral to its gear engaging position. A compression spring 29 is arranged on the guide-rod 28 between the upper end of the shifter bar and the end of the yoke, so that upon movement of the yoke 26, to the left the spring 29 will be compressed and urge the shifter bar 13 from its neutral position N to its first speed position 1. If, upon movement of the yoke 26 to the left, the gears of the gear shifting mechanism are not in a position to effect sliding engagement they will be resiliently urged toward the gear engaging position until they are turned slightly upon engagement of the clutch to effect sliding engagement. The yoke 26 is provided with a cylindrical extension 30 forming a plunger extending within an actuating coil 31, which is designed to produce sufficient magnetic pull on the plunger 30 to compress the spring 29 and move the shifter bar 13 into the first speed position 1. A short-circuited damping coil 32 is also arranged about the plunger 30 to retard the collapse of the magnetic field produced by the coil 31, when it is deenergized, sufficiently to permit the yoke 26 to be latched in its gear engaging position. The damping coil may be made of a copper sleeve, or any other suitable construction.

The circuit to the actuating coil 31 is opened upon movement of the yoke 26 and the plunger 30 to the left to the first speed position 1, as shown in the drawings, by a pin 33 carried by the plunger 30, which engages an arm 34 pivoted at 35, so as to open the contacts 36 and 37 of a switch connected in series with the actuating coil 31. When the yoke 26 is returned to the neutral position of the shifter bar 13, the pin 33 disengages the arm 34, so that the contacts 36 and 37 are closed to reestablish the circuit to the actuating coil 31. The yoke 26 and the plunger 30 are latched in this gear engaging position by a pawl 38, which engages the end 27a of the projection 27 on the yoke. It will be understood that the actuating coil 31 and the damping coil 32 are stationary and are mounted in such manner as to slidably fit the plunger 30, and that the yoke 26 and the plunger 30 are also suitably guided within their range of axial movement.

The shifter bar 12, which is shown in its neutral position N, is actuated from its neutral position to either the second speed position 2, or the third speed position 3, by a yoke 39 having a guide-rod 40 secured therein extending parallel to the direction of movement of the shifter bar 12. The guide-rod 40 is slidably fitted in an opening in the upper end of the shifter bar, and compression springs 41 and 42 are arranged on the rod 40 between the shifter bar and the ends of the yoke. The yoke 39 is provided with axial cylindrical extensions 43 and 44 forming plungers extending within the actuating coils 45 and 46. Short-circuited damping coils 47 and 48 are arranged on the plungers 43 and 44 respectively. The circuit through which the actuating coils 45 and 46 are energized includes normally closed switches biased to a closed position and having actuating arms 49 and 50, which are pivoted at 51 and 52 and arranged in the path of movement of pins 53 and 54 carried by the plungers 43 and 44 respectively. When the plunger 43 is moved to the right so as to urge the shifter bar 12 into its second speed position 2, the rod 53 will engage the arm 49 of the switch and open the contacts 55 and 56 thereof, so as to deenergize the actuating coil 45. Similarly, when the plunger 44 is moved to the left to urge the shifter bar 12 from the neutral to the third speed position 3, the pin 54 will engage the arm 59, so as to open the contacts 57 and 58 and deenergize the actuating coil 46.

The yoke 39 is provided with a projection 59 on the upper portion thereof having a notch 60 therein, which is engaged by the latch 61 to retain the yoke 39 and the shifter bar 12 in its neutral position when the shifter bar 13 is in its gear engaging position. The latch 61 is also adapted to engage the ends 62 and 63 of the projection 59 to latch the yoke 39 in a position to urge the shifter bar 12 to either the second or third speed position. Whenever the shifter bar 12 is in the second or third speed gear engaging position the shifter bar 13 is latched in its neutral position by the latch 38 engaging the end 27b of the projection 27.

In order to avoid possible damage to the gear shifting mechanism, or transmission, which might occur if the shifter bars 12 and 13 were both in a gear engaging position when the clutch is engaged to connect the engine to the wheels through the gear shifting mechanism, I construct this electrically responsive gear shifting mechanism, so that it first moves the shifter bar 12 or 13 to a neutral position before the other shifter bar is moved to a gear engaging position. This construction includes a neutralizing finger 64 arranged to engage the upturned end of the shifter bar 13, which is pivotally supported at 65, and which is provided with an extension 66 on which the latch 38 is pivoted at 67. The latch 38 is urged downwardly by a spring 68, and is limited in its downward movement with respect to the end 66 of the neutralizing finger by a pin 69. Upon raising the end 66 of the neutralizing finger, the lower end thereof, which is in engagement with the upturned end of the shifter bar in its gear engaging position shown in the drawings, will move the shifter bar to its neutral position N, and simultaneously release the latch 38, so that the yoke 26 will also move to its neutral position due to the compression of the spring 29 by this movement of the shifter bar 13. Upon lowering the end 66 of the neutralizing finger the latch 38 will engage the end 27b of the projection 27 and retain the shifter bar 13 in its neutral position.

In order to secure the shifter bar 12 in its neutral position before the shifter bar 13 is moved to its gear engaging position shown in the drawings, so as to insure that both of the shifter bars will be in the neutral position before either of them is moved to a gear engaging position, I provide neutralizing fingers 70 and 71 arranged on opposite sides of the upturned ends of the shifter bar 12 and in the path of movement of this shifter bar, which are pivotally supported at 72 and 73 respectively. The upper ends 74 and 75 of these neutralizing fingers are pivotally secured to the end 76 of a cross-bar 77, which extends through the end 75 of the neutralizing finger 71 and into a slot 78 in the upper end 74 of the neutralizing finger 70. By this arrangement the ends 74 and 75 of the neutralizing fingers can be raised by upward movement of the cross-bar 77, so as to swing them about their pivotal supports 72 and 73, and move the shifter bar 12 from the second or third speed position to its neutral position and retain it in this position until the neutralizing fingers are released. If the shifter bar 12 is in its neutral position the neutralizing fingers will be swung into engagement with the upturned end of the shifter bar 12, so as to retain it in the neutral position until the equalizing fingers are released.

The latch 61 is pivotally secured at 79 to the upper end 74 of the neutralizing fingers 70. The latch 61 is urged toward the top of the yoke 39 by a spring 80 and is limited in its downward movement with respect to the end 74 of the neutralizing finger by a pin 81. When the cross-bar 77 is raised, so as to swing the neutralizing fingers 70 and 71 to move the shifter bar 12 to its neutral position, or secure it in its neutral position, the latch 61 will be simultaneously disengaged from the top of the yoke 39 to permit its being moved to the neutral position by the springs 41 and 42, or to be moved to one of its gear engaging positions by the actuating coil 45 or 46. Movement of the yoke 39 toward either of the gear engaging positions will compress the spring 42 or 41 between the shifter bar and the ends of the yoke.

The other end of the cross-bar 77 is secured to the upper end 66 of the neutralizing finger 64, as indicated at 82. The cross-bar 77 is raised, so as to simultaneously actuate the neutralizing fingers 64, 70 and 71, by a pull-rod 83 having a plunger 84 thereon provided with an actuating coil 85. The actuating coil 85 is connected in the same circuit with the actuating coils 31, 45, and 46, so that whenever one of the actuating coils is energized, the actuating coil 85 will also be energized to swing the neutralizing fingers and move the shifter bars to a neutral position, or retain them in this position. The actuating coil 85 is also deenergized when one of the actuating coils associated with the shifter bar is deenergized upon opening one of the switches associated with the rods 33, 53, and 54. When one of the actuating coils 31, 45 or 46 and the actuating coil 85 are energized, the shifter bars 12 and 13 are urged toward or retained in their neutral position, and the yoke 26 or 39 is moved by an actuating coil to compress one of the springs 29, 41 or 42, so as to resiliently urge one of the shifter bars toward a gear engaging position. The movement of the yoke 26 or 39 toward its gear engaging position opens the circuit of the actuating coils, so as to deenergize them. The magnetic field established by energizing one of the actuating coils 31, 45 or 46 is sustained by the action of the short circuited damping coils 32, 47 or 48, upon opening the circuit to the adjacent actuating coil, which prevents the springs 29, 41 or 42 from moving the yokes 26 or 39 until the plunger 84 has dropped sufficiently to disengage the shifter bar and latch the yokes 26 and 39 in their neutral or gear engaging position.

It will be noted that the electrically responsive gear shifting mechanism which I have described actuates the shifter bars 12 and 13 from the neutral to the gear engaging position in the first, second or third speed. Whenever the reverse gear is engaged it is necessary that the other gears be disengaged, and this could readily be accomplished in the foregoing described construction by an electrical actuating coil. In the particular construction illustrated, however, I move the shifter bar 13 into its reverse gear position and simultaneously move the shifter bar 12 to a neutral position by providing a manually controlled lever 86, which is pivotally supported at 87 intermediate the ends thereof. The lower end of this lever is pivotally connected at 88 intermediate the ends of a cross-link 89 having one end connected to the end of the neutralizing finger 64 by a link 90, and the other end slidably connected to the shifter bar 13 by a link 91 having a slot 92 therein in which is arranged a pin 93 extending from the shifter bar. The slot 92 is long enough so that the shifter bar can be moved from its neutral position N to its first speed position I without affecting the lever 86. When it is desired to move the shifter bar 13 to engage the reverse gear R, the upper end of the lever 86 is pushed forwardly toward the shifter bar. The initial forward movement of the lever 86 swings the link 89 and causes the pin 93 to engage the end of the slot 92 adjacent the neutralizing finger 64, and further forward movement of the lever 86 pulls the shifter bar 13 from its first speed position I, or its neutral position N, into its reverse gear position R. This movement of the lever 86 also swings the neutralizing finger 64 about its pivotal support 65, so as to raise the cross-bar 77 and swing the neutralizing fingers 70 and 71 into engagement with the shifter bar 12 and retain it in its neutral position N. In order to prevent the actuating coils 85, 31, 45, and 46 being energized, when the shifter bar 13 is moved to its reverse gear position R, a switch 94 is connected in circuit with the actuating coils, which is connected by a link 95 to the lever 86, so that the switch 94 will be opened upon moving the lever 86 forwardly to actuate the shifter bar 13 to its reverse gear position.

The throttle valve 11 of the engine of the vehicle is actuated, so as to open and close the same, by a linkage including a foot-operated plunger 96 having a compression spring 97 biasing it to a position to close the throttle valve 11. This linkage includes a bell-crank lever 98 attached to a shaft 99, which is supported in suitable bearings. One arm of the bell-crank lever is secured to the plunger 96 at 96a, and the other arm thereof is provided with a pin 100 arranged in a slot 101 formed in the end of a link 102, which is pivotally connected at 103 to an arm 104 attached to the stem 105 of the throttle valve 11. The end of the arm 104 and the link 102 are connected to the plunger 19 of the double valve 17 by a rod 106, which is bent at right angles at 107 and extends through the openings in the ends of the rod 102 and the arm 104. This linkage is urged by a tension spring 108, connected to the end of the rod 107, toward a position in which the throttle valve 11 is opened, and the plunger 19 is projected within the body of the valve 17 to close the same. The tension of the spring 108 is not sufficient to move this linkage so as to actuate the throttle valve 11 from its closed to its open position against the stronger spring 97. Whenever the operator of the vehicle releases plunger 96, the throttle valve 11 will be closed, so that the engine runs at idling speed and the valve 17 will be opened, so that the power device 14 will disengage the clutch connecting the engine to the speed changing mechanism. On the other hand, whenever the operator depresses the plunger 96 the spring 108 moves this linkage, so as to open the throttle 11 and increase the torque produced by the engine and simultaneously closes the valve 17 to engage the clutch connecting the engine to the speed changing mechanism.

In order to coordinate the automatic shifting of the gears with the speed of the vehicle and the tractive effort produced on the wheels by the engine, I provide a centrifugal device, which is preferably connected by a shaft 109 to a driven member of the vehicle coupling the speed changing mechanism to the rear wheels, so that the shaft 109 is driven at a speed which is directly proportional to the speed of the vehicle. The speed of the vehicle at which this centrifugal device energizes the electrically responsive means for engaging and disengaging the clutch and shifting the gears is varied in accordance with the opening of the throttle 11 of the engine, produced by depressing the plunger 96, prior to the initiation of the gear shifting operation.

In the particular construction illustrated, the centrifugal device includes weights 110 which are pivotally supported on a shaft 111 extending at right angles to the shaft 109 and rigidly attached thereto. The weights 110 are urged toward a position at an acute angle with the axis of the shaft 109 by a spring 112. As the speed of the shaft 109 increases, the weights 110 are driven thereby at the same speed, and centrifugal force produced on the weights 110 causes them to move toward a plane extending through the axis of the shaft 111 and at right angles to the shaft 109. In order to utilize this movement of the weights to control the energization of the electrically responsive gear shifting mechanism, I provide cams 113 and 114 which are carried by a sleeve 115 having an axial, square opening therein fitting on the squared end 116 of the shaft 109 and slidable axially thereon. In this way, the force required to drive the cams 113 and 114 is obtained from the shaft 109 and the cams do not, therefore, react on the weights 110 so as to change their response to changes in speed against the action of the spring 112. The sleeve 115 is provided with an extension 117, which is connected to the weights 110 by a link 118. When the vehicle is stopped the shaft 109 is also stopped, as it is connected to the driving wheels, and the cams 113 and 114 are moved axially by the spring 112 to the position illustrated in the drawings. The cams 113 and 114 are utilized to control the energization of the actuating coils of the gear shifting mechanism by providing toggle switches, which are actuated by these cams. The first of these toggle switches is provided with arms 119 and 120 axially spaced apart by a block 122, which are pivotally supported on a shaft 121 arranged parallel with the shaft 109. In the position of the sleeve 115 shown in the drawings, to which it is moved by the spring 112 when the vehicle comes to rest, the arm 119 extends in the path of movement of the cam 113, so as to swing the arm 119 about the shaft 121 in which position the arm 123 of this switch engages the contact 124, as shown in the drawings. The arm 123 is moved into engagement with the contact 124 by this movement of the arm 119 by a toggle including the arm 123 which is pivotally supported at 125 and pivoted on an arm 126 having a pin 127 engaging a slot 128 in the extension 129 carried by the arms 119 and 120. The toggle action is obtained by providing a spring 130 connecting the pin 127 and a pin 131 on the arm 123. Bringing the arm 123 into engagement with the contact 124 actuates the electrically responsive gear shifting mechanism so as to move the shifter bar 13 into its first speed position. When the vehicle is started the rotation of the shaft 109 causes the weights 110 to swing toward a plane normal to the shaft 109 and move the sleeve 115 through the link 118 axially toward the end 116 of the shaft. The cam 113 is thus moved out of alinement with the arm 119 and into alinement with the arm 120. The cam 113 then engages the arm 120 and swings it to the right, so that the pin 127 is moved to the other side of the pivotal support 125 and the spring 130 swings the arm 123 into engagement with the contact 132 of the toggle switch, it being understood that this movement of the arm 120 also swings the arm 119 to the right as it is connected thereto. Bringing the arm 123 into engagement with the contact 132 completes a circuit to the electrically responsive gear shifting mechanism so as to shift the gears into the second speed position.

Upon further increase in speed of the shaft 109 the second toggle switch is actuated by the cam 114. This toggle switch includes arms 133 and 134, which are pivotally supported on the shaft 121 and spaced apart axially by a block 135, and an extension 136 having a slot 137 engaging a pin 138 carried by an arm 139 which is pivotally supported at 140. An arm 141 is also pivotally supported at 140 in engagement with a contact 142, a spring 143 being connected to the pin 138 and a pin 144 carried by the arm 141. In its initial position the arm 133 is the same distance from the axis of the shaft 116 as the arm 119 in its position shown in the drawings, so that the cam 114 on moving axially of the shaft 116 first passes the arm 133 and engages the arm 134, so as to swing the arm 134 to the right and move the arm 141 of the toggle switch into engagement with a contact 145. Bringing the arm 141 into engagement with contact 145, energizes the electrically responsive gear shifting mechanism, so as to move the shifter bar 12 into its third speed position. Upon a decrease in speed of the vehicle the cam 114 is first retracted from the end of the shaft 116 by the spring 112, so that it engages the arm 133 and swings the arm 141 into engagement with the contact 142 to shift the gears to the second speed position, then the cam 113 passes the arm 120 and then moves into engagement with the arm 119 so as to swing the arm 123 from the contact 132 into engagement with the contact 124 and thereby shift the gears into the first speed.

In order to modify the action of the centrifugal device including the weights 110 and the cams 113 and 114, so that the speed of the vehicle at which shifting of the gears takes place will be coordinated with the opening of the throttle when the gear shifting operation is initiated, I provide an arm 146 on the shaft 99 which is connected to a lever 147 by a spring 148, the lever 147 being pivotally supported at 149 and provided with a yoke 150 engaging an annular groove 151 in the sleeve 115. By this arrangement the speed of the shaft 109, at which the weights 110 move the sleeve 115 axially of the shaft 116 to successively shift the gears from the first to the second and then to the third speed, will be varied in accordance with the opening of the throttle 11 produced by depressing the plunger 96, which throughout its downward movement acts through the arm 146 to increase the tension of the spring 148 and resist the action of the weights 110 in moving the sleeve 115 toward the end 116 of the shaft.

It is necessary in the particular power system illustrated to close the throttle 11 of the engine and disengage the clutch before the electrically responsive gear shifting mechanism is energized to shift the gears. I, therefore, provide a throttle closing coil 152 having a plunger 153 which is connected at 154 to a bell-crank lever pivotally supported at 155, the other arm of the bell-crank lever being connected at 156 to the link 102. Upon energizing the throttle closing coil 152 the throttle 11 is moved to its closed position at which the engine will run at idling speed, and the plunger 19 is retracted, so as to open the valve 17 and apply the suction of the manifold 10 of the engine to the power device 14 to disengage the clutch. If the operator retains the plunger 96 in its depressed position, as soon as the throttle closing coil 152 is deenergized the throttle 11 will be reopened and the plunger 19 will be projected so as to close the valve 17 and engage the clutch.

When the arm 123 of the first toggle switch is brought into engagement with contact 124 by the action of the cam 113 on the arm 119, a circuit is completed between a battery 157 and the actuating coils 31 and 85 of the electrically responsive gear shifting mechanism and the throttle closing coil 152. This circuit includes the switch 94, conductor 158, arm 123 and contact 124 of the first toggle switch, conductor 159, contacts 36 and 37 which are then closed, actuating coils 31 and 85, conductor 160, throttle closing coil 152 to ground at 161, which completes a circuit to the battery 157 as one side thereof is grounded at 161a. The resistance of the throttle closing coil 152 is made such that upon closing of this circuit most of the voltage drop in the circuit is across the throttle closing coil, and the actuating coils 31 and 85 of the electrically responsive gear shifting mechanism are not energized sufficiently to actuate the plungers 30 and 84. The throttle closing coil 152 then acts to raise the plunger 153, so as to close the throttle 11 and reduce the speed of the engine to idling and, at the same time, retract the plunger 19 to open the valve 17 and disengage the clutch. After the power device has disengaged the clutch, the throttle closing coil 152 is short circuited by the closing of a switch having stationary contacts 162 and a movable contact 163. The contact 163 is pivotally connected at 164 to an arm 165 attached to the shaft 22 connecting the power device 14 and the clutch foot pedal 23 to the actuating arm of the clutch. Bridging the contacts 162 short circuits the throttle closing coil 152 through a circuit including conductors 166, 160 and 167. Upon disengaging the clutch and short circuiting the throttle closing coil 152, the voltage applied to the actuating coils 31 and 85 suddenly rises sufficiently to immediately raise the plunger 84. Raising the plunger 84 swings the neutralizing fingers 70, 71, and 64 into engagement with the shifter bars 12 and 13 respectively, and simultaneously releases the latches 38 and 61. This movement of the neutralizing fingers brings the shifter bars 12 and 13 into a neutral position, or retains them in this position. The actuating coil 31 moves the plunger 30 and the yoke 26 to the left, so as to compress the spring 29 against the shifter bar 13 in its neutral position. At the end of the range of movement of the plunger 30, the rod 33 engages the arm 34 of the switch to open the contacts 36 and 37 and deenergize the actuating coils 31 and 85. The plunger 84 then drops downwardly, which lowers the cross-bar 77 and releases the neutralizing fingers 64, 70, and 71 permitting the spring 29 to move the shifter bar 13 into its first speed position and simultaneously engage the latch 38 with the end 27a of the projection 27 and also engage the latch 61 with the notch 60, as shown in the drawings. The engagement of these latches retains the shifter bar 13 in its first speed position and retains the shifter bar 12 in its neutral position. The damping coil 32 sufficiently retards the collapsing of the field produced by deenergizing the actuating coil 31 to maintain the plunger 30 in the first speed position until the latch 38 engages the projection 27. It will be understood that the shifter bar 13 comes in contact with the neutralizing finger 64 upon moving to its first speed position. The shifter bar 13 is moved into its first speed position, as above described during the interval between the closing of the contacts 162 of the short circuiting switch connected across the throttle closing coil 152, and the subsequent movement of the throttle 11 and the plunger 19 to increase the speed of the engine and engage the clutch. As a result the opening of the engine throttle and engagement of the clutch takes place as soon as the shifter bar 13 is latched in its first speed position so that smooth operation is obtained.

The throttle 11 will ordinarily be opened by depressing the foot-operated plunger 96 in starting the vehicle, and the rate of acceleration of the vehicle will depend on the opening of the throttle 11 produced in this way. As the speed of the vehicle increases the weights 110 of the centrifugal device will act against the springs 112 and 148, to move the sleeve 115 toward the end of the shaft 116. The cam 113 will then come into engagement with the arm 120 and actuate the toggle switch so that the arm 123 engages the contact 132. This connects one side of the battery 157 to the actuating coils 45 and 85 of the electrically responsive gear shifting mechanism and the throttle closing coil 152 by a circuit including switch 94, conductor 158, arm 123, contact 132, conductor 168, arm 141, contact 142, conductor 169, contacts 55 and 56 of the switch associated with the rod 53 to one side of the actuating coil 45, conductors 170 and 171 to the actuating coil 85, and conductor 160 to the throttle closing coil 152, and ground at 161 to complete a circuit to the other side of the battery, which is grounded at 161a. The closing of this circuit will not energize actuating coils 45 and 85 sufficiently to move the plungers 43 and 84, but will raise the plunger 153 to close the throttle valve 11 and open the valve 17, so as to actuate the power device 14 and disengage the clutch. After the clutch is disengaged the contacts 162 of the switch short circuiting the throttle closing coil will be bridged by the contact 163. This will increase the voltage applied to the actuating coils 45 and 85, which releases the latches 38 and 61 and actuates the neutralizing fingers 64, 70, and 71 to move the shifter bar 13 to its neutral position N, and to engage the shifter bar 12 to retain it in its neutral position. The actuating coil 45 will move the plunger 43 to the right and compress the spring 40 to urge the shifter bar 12 toward its second speed position 2, but movement of the shifter bar 12 from its neutral position will be prevented by the neutralizing fingers 70 and 71, which are in engagement therewith. Toward the end of the range of movement of the plunger 43, the pin 53 will engage the arm 49 and open the contacts 55 and 56 of the switch, which deenergizes the actuating coils 45 and 85. The plunger 84 and the cross-bar 77 will then drop downwardly, releasing the neutralizing fingers 64, 70, and 71 from the shifter bars 12 and 13, engaging the latch 38 with the end 27b of the projection 27 to retain the shifter bar 13 in its neutral position, and engaging the latch 61 with the end 63 of the projection 59, so as to retain the plunger 43 in the position to urge the shifter bar 12 toward its second speed position 2. Upon releasing the neutralizing fingers 70 and 71 from the shifter bar 12 and engaging of the latches 38 and 61 the spring 41 will move the shifter bar 12 into its second speed position 2. The plunger 43 and the yoke 39 will be prevented from moving until the latch 61 has engaged the projection 59 at 63 by the retarding action of the damping coil 47. The shifter bar 12 will be moved into its second speed position 2, in the interval between the short circuiting of the throttle closing coil 152, and the opening of the throttle and engagement of the clutch, which gradually takes place when the throttle closing coil 152 is short circuited.

The vehicle will increase in speed after the second speed 2 is engaged, and the weights 110 of the centrifugal device will move the sleeve 115 toward the end of the shaft 116, so that the cam 114 will first pass the arm 133, then engage the arm 134 and actuate the second toggle switch to bring arm 141 thereof into engagement with the fixed contact 145. This completes a circuit between the battery 157, and the actuating coils 46 and 85 of the electrically responsive gear shifting mechanism and the throttle closing coil 152. This circuit includes conductors 158, arm 123, contact 132, conductor 168, arm 141, contact 145, conductor 172, contacts 58 and 57 to the actuating coil 46, conductor 171 to the actuating coil 85, conductor 169 to the throttle closing coil 152, and to the other side of the battery through ground at 161, as the battery is grounded at 161a. Completing this circuit will not energize the actuating coils 46 and 85 sufficiently to shift the gears, but will energize the throttle closing coil 152 to close the throttle 11 and open the valve 17 so as to disengage the clutch. After the clutch is disengaged the throttle closing coil 152 will be short circuited by the closing of the contacts 162 and 163, which will sufficiently increase the voltage applied to the actuating coils 46 and 85 to raise the plunger 84 and move the plunger 44 to the left. This raises the cross-bar 77 to disengage the latches 38 and 61, and swings the neutralizing finger 64 into engagement with the shifter bar 13 and retains it in its neutral position, and also swings the neutralizing fingers 70 and 71 into engagement with the shifter bar 12 to move it to its neutral position where it will be retained by the neutralizing fingers. Movement of the plunger 44 to the left compresses the spring 42 and urges the shifter bar 12 toward its third speed position 3, but it will be prevented from moving by the neutralizing fingers. Toward the end of the range of movement of the plunger 44 the rod 54 will engage the arm 50 and open the contacts 57 and 58 thereby deenergizing the actuating coils 46 and 85. The plunger 84 and the cross-bar 77 will then drop downwardly, so that the latch 38 will engage the end 27b of the projection 27 to retain the shifter bar 13 in its neutral position and the latch 61 will engage the projection 59 at 62 to retain the yoke 39 in the position to compress the spring 42 and urge the shifter bar 12 toward its third speed position 3. The movement of the plunger 44 will be retarded to permit engagement of the latches by action of the damping coil 48. Simultaneously, with engagement of the latches 61 and 38, the neutralizing fingers 64, 70 and 71 will swing away from the shifter bars 12 and 13, and the shifter bar 12 will be moved into its third speed position 3 by the spring 42. This actuation of the electrically responsive gear shifting mechanism into its third speed position 3 will occur in the interval between the closing of the contacts 162 and 163, and the opening of the throttle 11 and the closing of the valve 17 to engage the clutch, so as to produce smooth operation.

Under some conditions of operation it will be desirable to control the gear shifting mechanism manually, and I provide for this manual operation by arranging a switch to disconnect the centrifugally actuated switches from the electrically responsive gear shifting mechanism, and establish a connection between the electrically responsive gear shifting mechanism and the battery by circuits including a manually controlled switch by which the gears can be shifted electrically into the first, second and third speed positions. This construction includes interconnected switch arms 173, 174, and 175, which in the position illustrated in the drawings, complete the circuits between the centrifugally controlled toggle switches and the gear shifting mechanism. These arms are interconnected as indicated at 176 so that they can be swung upwardly into engagement with adjacent contacts 177, 178 and 179, which are connected to corresponding contacts 180, 181 and 182 associated with a manually operable switch arm 183. This switch arm is connected to the battery 157 by conductors 184 and 158. Moving the arm 183 into engagement with the contacts 180, 181 or 182 will energize the electrically responsive gear shifting mechanism from the battery 157 to shift the gears into the first, second or third speed positions, and the clutch can be actuated by the foot pedal 23, or by manipulation of the throttle controlling plunger 96. When it is desired to shift the gears automatically the arms 173, 174 and 175 are restored to the position shown in the drawings which completes a circuit between the battery and the contacts of the centrifugally controlled first and second toggle switches above described.

In the operation of the power system shown in Fig. 1, before the engine is started the lever 86 is moved forwardly away from the switch 94 to move the shifter bar 13 into its neutral position, and the lever 86 is then returned to close the switch 94. This is necessary as the cam 113 actuates the arm 119 of the first toggle switch to energize the actuating coils 31 and 85 when the vehicle comes to a stop, so that when the engine is stopped the shifter bar 13 is in its first speed position shown in the drawings. Stopping the engine causes the pressure to rise in the intake manifold 10 and the power device 14 will no longer disengage the clutch. If the engine were started at this time, power would be transmitted from the engine through the speed changing mechanism to the driving wheels. Upon moving the shifter bar 13 to its neutral position and starting the engine, the throttle 11 will be in its idling position and the plunger 19 retracted to open the valve 17, and the clutch will be gradually disengaged by the reduction in the pressure in the power device 14. A circuit will then be completed between the battery 157, actuating coils 31 and 85 of the electrically responsive gear shifting mechanism, and the throttle closing coil 152, so that the throttle 11 will be moved to its closed position, and the valve 17 will be opened to disengage the clutch. After the clutch is disengaged the movable contact 163 will bridge the contacts 162 and short circuit the throttle closing coil 152, so as to increase the voltage applied to the actuating coils 31 and 85 and to move the shifter bar 13 into its first speed position, at the same time opening the circuit through the actuating coils 31 and 85 by separating the contacts 36 and 37. If the operator depresses the plunger 96 to open the throttle 11, the plunger 19 will close the valve 17 and engage the clutch to start the vehicle.

If the throttle 11 is fully opened to obtain maximum acceleration, the tractive effort-vehicle speed curve in the first speed will approximate that indicated at A in Fig. 4, and the first speed will remain engaged until the tractive effort developed in this first speed is slightly less than the tractive effort which would be developed in the second speed position at this particular vehicle speed. This is indicated in Fig. 4 where the curve A crosses the tractive effort-vehicle speed curve B in the second speed position. Under this full throttle opening the spring 148 will resist the action of the weights 110 of the centrifugal device and delay the shifting from the first to the second speed until the proper time. Under this condition the weights 110 will move the cam 113, so that it actuates the arm 120 to move the arm 123 of the first toggle switch into engagement with the contact 132. This completes the circuit from the battery 157 to the actuating coils 45 and 85 and the throttle closing coil 152. The throttle closing coil then moves the link 102, so that slot 101 therein slides on the pin 100 and closes the throttle 11 and opens the valve 17 against the action of the spring 108 to reduce the speed of the engine to idling speed and to disengage the clutch. After the clutch is disengaged the contact 163 bridges the contact 162 and short circuits the throttle closing coil 152 which increases the voltage across the actuating coils 45 and 85. This actuates neutralizing fingers 64, 70, and 71 to move the shifter 13 into its neutral position and to retain the shifter bar 12 in its neutral position and, simultaneously, releases the latches 38 and 61. At the same time the actuating coil 45 moves the plunger 43 to the right, to compress the spring 41, and to bring the rod 53 into engagement with the arm 49, which opens the contacts 55 and 56 and deenergizes the actuating coils 45 and 85, so that the neutralizing fingers are released and the latches 61 and 38 will latch the yoke 26 in its neutral position and latch the yoke 39 in the second speed position. This actuation of the electrically responsive gear shifting mechanism takes place in the interval between the closing of contacts 162 and 163 and the opening of the throttle 11, and the engagement of the clutch by the spring 108 projecting the plunger 19 to close the valve 17. The vehicle will then run in second speed producing the tractive effort vehicle speed curve like that indicated at B in Fig. 4, and remain in second speed until the tractive effort in this speed becomes slightly less than that which would be produced in third speed at the vehicle speed finally attained in the second speed.

After the vehicle speed is further increased and the tractive effort is slightly less than that which would be produced at third speed as indicated by the curve C in Fig. 4, the cam 114 will pass the arm 133 and engage the arm 134 of the second toggle switch and move arm 141 thereof into engagement with the contact 145. This will complete a circuit between the battery 157 and the actuating coils 46 and 85 and the throttle closing coil 152. As the clutch is engaged, the contacts 162 will not be bridged by movable contact 163 so that completing this circuit will energize the throttle closing coil 152 to close the throttle 11 and to open the valve 17 and initiate disengagement of the clutch. Actuating coils 46 and 85 of the electrically responsive gear shifting mechanism will not be energized sufficiently to actuate the plungers 44 and 84. After the clutch is disengaged the movable contact 163 will bridge the contacts 162 and short circuit the closing coil 152 thereby increasing the voltage applied to the actuating coils 46 and 85. This will move the neutralizing finger 64 in a position to retain the shifter bar 13 in its neutral position, and will also actuate the neutralizing fingers 70 and 71, so as to move the shifter bar 12 from its second speed position 2, to its neutral position. Simultaneously with this movement of the neutralizing fingers, the latch 61 is released from top of the yoke 39, so that the actuating coil 46 will move the plunger 44 to the left and compress the spring 42 and urge the shifter bar 12 toward the third speed position, but movement of the shifter bar will be prevented by the neutralizing fingers. Toward the end of the travel of the plunger 44, the rod 54 will engage the arm 50, to open the contacts 57 and 58 and to deenergize the actuating coils 46 and 85. The plunger 84 and the cross-bar 77 will then drop downwardly so that the latch 38 will engage the end 27b of the projection 27 to retain the shifter bar 13 in its neutral position, and the latch 61 will engage the end 62 of the projection 59 on the yoke 39 to retain the yoke in a position to urge the shifter bar 12 toward its third speed position. The movement of the yoke 39 and the plunger 44 will be delayed sufficiently to permit the latches to engage by the action of the damping coil 48. During engagement of the latches in this way the neutralizing fingers 70 and 71 will release the shifter bar 12, and the spring 42 will move this shifter bar into its third speed position 3.

The movement of the shifter bar 12 in its third speed position 3, as above described, will take place in the interval between the closing of the contacts 162 and 163 after disengagement of the clutch and before the throttle has been reopened and the clutch engaged by the action of the spring 108 on the plunger 19 and the throttle 11. This produces a smooth shifting of the gear from second to third speed, and the vehicle is operated in the third speed. If the vehicle ascends a steep grade necessitating shifting into the second or first speed position, the speed of the vehicle will first decrease until the weights 110 retract the sleeve 115 and bring the cam 114 into engagement with the arm 133 of the second toggle switch, which will move the arm 141 thereof from the contact 145 into engagement with the contact 142, as shown in the drawings. This will initiate a similar series of operations of closing the throttle and disengaging the clutch and shifting the gears from the third to second speed, and then reengaging the clutch as above described. If the vehicle speed further decreases while running in second speed, the cam 113 will first pass the arm 120 of the first toggle switch and engage the arm 119 thereof, so as to move the arm 123 of this switch into engagement with the contact 124. This will also initiate an operation of successively closing the throttle, disengaging the clutch, moving the shifter bar 12 to its neutral position and moving the shifter bar 13 into its first speed position, then reengaging the clutch, so that the vehicle will then ascend the grade in first speed. The gears will then be automatically shifted as required by the operating conditions.

When starting up gradually with a low rate of acceleration, as desired under most operating conditions, the plunger 96 will be depressed to only slightly open the throttle 11. The tension on the spring 148 will be increased and the weights 110 will act on the sleeve 115 to move the cams 113 and 114 through the successive positions in which the gears are shifted from first, to second, and then to third speed at a lower vehicle speed, the tractive effort—vehicle speed curves in the first, second and third speeds being similar to that shown in Fig. 4 for a fully open throttle, but having correspondingly less values of tractive effort and vehicle speed depending upon the degree of opening of the throttle 11.

When the vehicle is stopped by releasing the plunger 96 so as to close the throttle and applying the brakes, the cam 113 will be brought into engagement with the arm 119 of the first toggle switch and move the arm 123 thereof into engagement with the contact 124. This latches the shifter bar 12 in its neutral position and moves the shifter bar 13 into its first speed position as shown in the drawings. In starting, when the throttle 11 is opened by depressing the plunger 96, the clutch will be engaged and the gears of the speed changing mechanism will be shifted automatically as required.

It will be noted that whenever the electrical circuits in the power system which I have described are completed to effect automatic shifting of the gears of the speed changing mechanism, the circuits are opened so that no power is required by the battery 157 except in the interval in which these automatic operations take place.

In the embodiment of my invention shown in Fig. 2, I have illustrated a power system in which the gears of the speed changing mechanism connecting the engine to the driving wheels of the vehicle are automatically shifted, and in which the electromagnets of the gear shifting mechanism are not utilized to shift the gears directly, but only for the purpose of changing the relation of controlling stops, so as to effect shifting of the gears. This has the advantage of minimizing the amount of power required to be supplied by the battery of the vehicle to automatically shift the gears of the speed changing mechanism. This power system for an automobile includes an internal combustion engine provided with an intake manifold 185 through which the combustible mixture is supplied from a carburetor to the engine cylinders. The torque produced by the engine is controlled by the opening and closing of a throttle valve 186, which in its closed position permits a sufficient flow of combustible mixture to operate the engine at idling speed. The engine is connected to the driving wheels of the vehicle through a clutch and a speed changing, or gear shifting mechanism, having shifter bars 187 and 188 for moving the gears of the gear shifting mechanism to a neutral or gear engaging position. The clutch connecting the engine and the speed changing mechanism is biased in the usual way to a position in which the clutch is engaged, and a power device 189 is provided for controlling the engagement and disengagement of the clutch.

This power system is similar to that shown in Fig. 1, and includes an electrically responsive gear shifting mechanism for actuating the shifter bars 187 and 188 from their neutral to their gear engaging positions, which is controlled by a centrifugal switch responsive to the speed of a driven member connecting the speed changing, or gear shifting mechanism, to the driving wheels of the vehicle. The particular speed of the driven member at which the electrically responsive gear shifting mechanism is actuated to shift the gears is modified by a spring, or other suitable arrangement, in accordance with the movement of the throttle controlling lever of the vehicle. In the interval during which the gears are shifted the throttle is automatically closed and the clutch disengaged, and after the gears are shifted the throttle is released, so that it can be opened and the clutch engaged. In this way the shifting of the gears of the vehicle is coordinated with the speed of the vehicle and the actuation of the throttle controlling lever in such manner as to produce maximum acceleration of the vehicle for any particular throttle opening, and obtain the most satisfactory performance of the vehicle, without any attention on the part of the operator.

The power device 189 is of the vacuum operated type, and is connected to the intake manifold 185 of the engine by pipes 190, 191, and a double valve 192 having plungers 193 and 194. When the vehicle is running under power and the gears automatically shifted, the plunger 193 is in the position shown in the drawings, in which an opening 195 is in alinement with the opening 196 through the double valve. The plunger 194 is provided with an opening 197 shown projected out of alinement with the openings 195 and 196 to close the valve, which can be brought into alinement with these openings to open the valve by retracting the plunger 194. The plunger 194 is also provided with a slot 194a which vents the power device 189 to engage the clutch when the plunger is projected. In the projected position of the plunger 194, shown in the drawings, the power device is vented and the valve 192 cuts off communication between the intake manifold 185 and the power device 189, which engages the clutch. When the plunger 194 is retracted the valve 192 is opened, which affords communication between the intake manifold 185 and the power device 189, and the vent 194a is closed, which disengages the clutch. Opening the valve 192 actuates the power device 189 to disengage the clutch through a linkage including the link 198 and an arm 199 attached to a shaft 200, which is mounted on suitable bearings, and which is connected to the clutch controlling arm. A foot pedal 201 is loosely mounted on the shaft 200, and provided with a projection 202, which engages a collar 203 fixed on the shaft 200, so that upon depressing the foot pedal 201 the clutch can be disengaged independently of the power device 189. The foot pedal can be actuated independently of the power device 189, as the link 198 is connected to the arm 199 by a pin 204 extending into a slot 205 in the arm.

In this embodiment of my invention, the shifter bars 187 and 188 are actuated by a gear shifting mechanism, which is electrically controlled, so as to move both of the shifter bars to a gear engaging position, the electrical controlling coils of the gear shifting mechanism being arranged so that they are deenergized as soon as they are actuated. The power for shifting the gears is obtained from the power device 189. This gear shifting mechanism includes levers 206 and 207, which are pivotally connected at 208 and 209 to the shifter bars 187 and 188 respectively. The levers 206 and 207 are pivotally connected intermediate the ends thereof to shafts 210 and 211 respectively. The shaft 210 is secured to an arm 212, which is attached to one end of a shaft 213 extending through a sleeve 214 mounted in a bearing 215. The other end of the shaft 213 is attached to a downwardly depending arm 216, which is connected at its lower end to a tension spring 217. The shaft 211 is connected to an arm 218, which is attached to one end of the sleeve 214. The other end of the sleeve 214 is provided with a downwardly depending arm 219 having a tension spring 220 connected to the lower end thereof. The arms 216 and 219 are connected to the power device 189 by pins 221 and 222 extending into slots 223 and 224 in a forked link 225 connected to an arm 226 attached to the shaft 200. These slots are arranged so that upon reciprocation of the forked link 225 the pins 221 and 222 come to the end of their range of movement to actuate the shifter bars 187 and 188, and in subsequent further movement of the link 225 to the position shown in the drawings the clutch is engaged. By this arrangement, whenever the power device 189 is actuated to disengage the clutch, the forked link 225 moves the arms 216 and 219 against the action of the tension springs 217 and 220. When the power device is actuated to engage the clutch the forked link 225 permits the springs 217 and 220 to return the arms 216 and 219 toward their initial positions. This movement of the arms 216 and 219 produced by the disengagement and engagement of the clutch reciprocates the shafts 210 and 211 through the shaft 213, sleeve 214, and arms 212 and 218.

In order to utilize the reciprocatory movement of the shafts 210 and 211, which are pivotally connected to the levers 206 and 207, first to move the shifter bars 187 and 188 to a neutral position, and then to move one of them to a gear engaging position, I arrange stops on opposite sides of the reciprocating pivotal connections in the path of reciprocatory movement of both levers 206 and 207, the stops being retractable out of the path of movement of the levers to obtain the desired actuation of the shifter bars. In the particular construction illustrated, stops 227 and 228 are supported for sliding axial movement parallel to the axis of the shaft 210, and are arranged on opposite sides of the pivotal connection between the lever 206 and the shaft 210. The stop 227 is slidably supported in openings 229 and 230 in the upper portion of a C-shaped bracket 231, which is rigidly supported on a suitable framework. The stop 228 is also slidably supported in openings 232 and 233 in the lower portion of the C-shaped bracket. The stops 227 and 228 are interconnected by a rocking bar 234 extending through openings 235 and 236 in the ends of the stops, and pivotally supported intermediate the ends thereof on a bar 238 secured to the C-shaped bracket 231. It will be noted, that when the stop 227 is projected in the path of reciprocatory movement of the lever 206, as shown in the drawings, the stop 228 will be retracted by the rocking bar 234 out of the path of movement of the lever 206. The stop 227 is arranged in such relation to the upper end of the lever 206 that reciprocation of the shaft 210, produced by disengagement and engagement of the clutch, will move the shifter bar 187 into its first speed position 1. The relation of the linkage connecting the shaft 210 with the power device 189 is such that the arm 206 moves the shifter bar 187 into its first speed position 1 before the clutch is engaged. In the mid-position of the rocking bar 234 the stops 227 and 228 are projected an equal distance from the C-shaped bracket 231, and both of them will be in the path of reciprocatory movement of the lever 206, so that reciprocation of the shaft 210 produced by oscillation of shaft 200 during disengagement and prior to reengagement of the clutch will first cause the lower portion of the lever 206 to engage the stop 228 and move the shifter bar from its first speed position 1 to its neutral position N, and when the shifter bar reaches its neutral position the upper end of the lever 206 will engage the stop 227, so as to retain the shifter bar 187 in its neutral position. In the other extreme position of the rocking bar 234 the stop 228 will be projected into the path of movement of the lever 206, and the stop 227 will be retracted out of the path of movement of the lever 206, so that reciprocatory movement of the shaft 210 will cause the lever 206 to engage the stop 228 and move the shifter bar 187 from its first speed position 1, or its neutral position N, to the reverse position R, during which movement the upper end of the lever 206 will swing past the retracted end of the stop 227.

The stops 227 and 228 are preferably actuated electrically to obtain the desired movement of the shifter bar 187 to its first speed position 1, or to its reverse position, and the circuits of this electrical control are arranged to be deenergized upon actuating the stops. The stop 227 is projected into the path of movement of the lever 206, and the stop 228 is retracted out of the path of movement thereof, to obtain movement of the shifter bar 187 to its first speed position, by an actuating coil 239, which is supported within the C-shaped bracket 231, and which is connected to the controlling circuits through a double switch. This double switch has fixed contacts 240 and 241 and movable contacts 242 and 243, which are urged into engagement with the fixed contacts by a spring 244. The movable contact 242 is carried by an operating arm 245, and the movable contact 243 is carried by an operating arm 246, both of these arms being pivotally supported at 247. The operating arm 245 is arranged to be engaged by the upper end of the rocking bar 234 toward the end of its range of movement, so as to open the contacts 240 and 242, which deenergizes the actuating coil 239, as it is connected to the controlling circuits through these contacts.

The rocking bar 234 is moved to the other end of its range of rocking movement by an actuating coil 248, to retract the stop 227 out of the path of movement of the lever 206 and to project the stop 228 into the path of movement of the lever, and thereby actuate the shifter bar 187 into its reverse position R. The actuating coil 248 is supported in the C-shaped bracket 231, and connected to the controlling circuits through the stationary contact 241 and movable contact 243 of the double switch. The operating arm 246 is pivotally supported at 247 near the end of the path of movement of the upper end of the rocking bar 234 produced by the actuating coil 248 so that the operating arm is engaged by the rocking bar to open contacts 241 and 243 and deenergize the actuating coil 248.

The shifter bar 188 is retained in its neutral position, moved from its neutral position to either of its gear engaging positions, or moved from one of its gear engaging positions to another, in response to reciprocation of the shaft 211, by cooperating stops 249 and 250, which extend parallel to the shaft 211, and which are retractably arranged in the path of movement of the lever 207 on opposite sides of the shaft 211. The stops 249 and 250 are arranged in such relation to the lever 207 that upon reciprocation of the shafts 210 and 211 produced by disengagement and engagement of the clutch, the lever 207 engages the stops 249 and 250, in their position illustrated in the drawings, to retain the shifter bar 188 in its neutral position simultaneously with the movement of the shifter bar 187 to its neutral position, after which further actuation of the lever 206 will move the shifter bar 187 to its first speed position by the lever 206 engaging the stop 227 and swinging past the stop 228, this movement of the shifter bar 187 to its first speed position occurring before the engagement of the clutch. Similarly, when the shifter bar 187 is moved into its reverse position R upon reciprocation of the shafts 210 and 211, the shifter bar 188 will be retained in its neutral position by engagement with the stops 249 and 250 and the shifter bar 187 will first move to its neutral position by engagement with the stop 228 and, upon further movement of the arm 206, will swing past the retracted end of the stop 227 and move the shifter bar 187 into its reverse position.

The stop 249 is slidably supported in openings 251 and 252 in the upper end of a C-shaped bracket 253, and the stop 250 is slidably supported in openings 254 and 255 in the lower end of this C-shaped bracket. The C-shaped bracket is also rigidly supported on a suitable framework. The stops 249 and 250 are interconnected at the ends thereof by a rocking bar 256 extending through openings 257 and 258 in the ends of the stops. This rocking bar is pivotally supported intermediate the ends thereof at 259 on a bar 260 attached to the C-shaped bracket 253. By this arrangement, when the stop 249 is further projected in the path of movement of the lever 207, the stop 250 is retracted out of the path of movement of the lever 207, so as to move the shifter bar 188 into its third speed position. Similarly, when the stop 250 is further projected in the path of movement of the lever 207, the stop 249 is retracted out of the path of movement thereof, so that the lever 207 will move past the end of the stop 249 and move the shifter bar 188 to its second speed position.

The stops 249 and 250 are electrically actuated and the circuit is arranged to be deenergized after the stops are moved to the desired position. The stop 249 is further projected in the path of movement of the lever 207, and the stop 250 is retracted out of the path of movement thereof, to move the shifter bar 188 from its second speed or neutral position to its third speed position, by an actuating coil 261, which is connected to the control circuits through a double switch. This double switch has stationary contacts 262 and 263, and movable contacts 264 and 265, which are urged into engagement with the stationary contacts by a spring 266. The movable contacts 264 and 265 are carried by operating arms 267 and 268, which are pivotally supported at 269. The operating arm 267 is arranged to be engaged by the upper end of the rocking bar 256 toward the end of its range of movement produced by the actuating coil 261, so as to open the contacts 262 and 264 and deenergize the actuating coil 261, which is connected to the control circuits through these contacts. The stop 250 is further projected into the path of movement of the lever 207 and the stop 249 is retracted out of the path of movement of the lever 207, so as to move the shifter bar 188 from its neutral position or third speed position, to its second speed position by an actuating coil 270, which is supported in the C-shaped bracket 253. Near the end of the range of movement of the rocking bar 256, produced by the actuating coil 270, the upper end of the rocking bar engages the operating arm 268 of the double switch, so as to open the contacts 263 and 265 and deenergize the actuating coil 270, which is connected to the control circuit through these contacts.

In order to prevent both of the shifter bars 187 and 188 being moved to a gear engaging position at the same time, I mechanically interlock the rocking bars 234 and 256, so that whenever one of the stops connected to these rocking bars is projected into the path of movement of the adjacent reciprocating lever, the stops connected to the other rocking bar will both be retained in the path of movement of the cooperating reciprocating lever, so that one of the shifter bars will be moved to its gear engaging position, and the other will be retained in its neutral position. This mechanical interlock includes an interlocking bar 271 slidably supported on the C-shaped brackets 231 and 253 in alinement with the supporting bars 238 and 260. One end of the interlocking bar 271 is provided with a U-shaped cross-bar 272 extending parallel to the main body of the C-shaped bracket 253 and having inturned ends 273 and 274, which in the position shown in the drawings, engage the rocking bar 256 on opposite sides of the pivotal support 259 and equidistant therefrom, so as to retain the rocking bar in its mid-position with the stops 249 and 250 both in the path of reciprocatory movement of the lever 207, which retains or moves the shifter bar 188 to its neutral position N in response to reciprocation of the shaft 211. The other end of the interlocking bar 271 is provided with a U-shaped cross-bar 275 extending parallel to the body of the C-shaped bracket 231 and having inturned ends 276 and 276a extending across the rocking bar 234 and arranged equidistant from its pivotal support 237. The distance between the cross-bars 272 and 275 is such that when the rocking bar 234 projects the stop 227 and retracts the stop 228, as shown in the drawings, the lower end of the rocking bar will engage the arm 276a and move the interlocking bar 271 to the right, so as to bring both ends 273 and 274 of the cross-bar 272 into engagement with the rocking bar 256 and retain the rocking bar in its mid-position and project both of the stops 249 and 250 in the path of movement of the lever 207. Similarly, when the rocking bar 234 is moved to project the stop 228 in the path of movement of the lever 206 and retract the stop 227 out of the path of movement of this lever, the other end of the rocking bar will engage the arm 276 of the cross-bar and also retain the rocking bar 256 in its mid-position shown in the drawings. Whenever the rocking bar 256 is moved from its mid-position to project one of the stops 249 or 250 connected thereto further in the path of movement of the lever 207 and to retract the other stop out of the path of movement of this lever, so as to move the shifter bar 188 into its second or third speed position in response to reciprocation of the shaft 211, the arms 276 and 276a connected to the interlocking bar will move the rocking bar 234 to its mid-position and retain both of the stops 227 and 228 in the path of movement of the lever 206, which retains or moves the shifter bar 187 into its neutral position.

The actuation of shifter bars 187 and 188 of the gear shifting mechanism as above described, is initiated in accordance with the speed of the vehicle, and the opening of the throttle 186, so as to coordinate the shifting of gears with the tractive effort and speed of the vehicle prior to the initiation of the gear shifting operation. I do this by providing switches, which are actuated by a centrifugal device responsive to the speed of the vehicle, and modified in its action by the opening of the throttle when the gear shifting operation is initiated.

This centrifugal device is of the same construction shown in Fig. 1, and includes a shaft 277, which is driven by the connection between the speed changing mechanism and the driving wheels, so that it is driven at a speed which is directly proportional to the speed of the vehicle. Weights 278 are pivotally mounted on a shaft 279 secured to the shaft 277 at right angles thereto, and the weights 278 are retained in a position inclined to the axis of the shaft 277, as shown in the drawings, by a spring 280. As the speed of the shaft 277 increases, the weights 278 are centrifugally actuated, so that they move toward a plane at right angles to the shaft 277, and correspondingly move a sleeve 281 having a square axial opening fitted on the square portion 282 of the shaft and connected to the weights 278 by a link 283. The sleeve 281 is, therefore, moved toward the end of the shaft 282, as the speed of rotation of the weights 278 increases. The sleeve 281 is provided with axially spaced cams 284 and 285, and when the vehicle is operating at low speed with the various elements of the system in the relation shown in the drawings, or at standstill, the cam 284 engages an arm 286 of a first toggle switch. This toggle switch includes another arm 287, and the arms 286 and 287 are spaced apart by a block 289 and pivotally mounted on a shaft 288 extending parallel to the axis of the shaft 277. The arms 286 and 287 are provided with a lower extension 290 having a slot 291 in the end thereof engaging a pin 292 carried by the toggle mechanism of the switch. This toggle includes arms 293 and 294, which are pivotally mounted at 295, the lower arm being provided with a pin 296, and a spring 297 is connected between the pins 292 and 296, so as to move the arm 294 and the toggle switch into engagement with a fixed contact 298 in response to moving the arm 286 to the position shown in the drawings. Bringing the contact 294 into engagement with the contact 298 closes the circuit between a battery 299 and the actuating coil 239 of the electrically responsive gear-shifting mechanism and a throttle closing coil 300 by a circuit including switch 301, switch 302, conductor 303, arm 294 of the first toggle switch, contact 298, conductor 304, contact 305 of a switch, conductor 306 to actuating coil 239, conductor 307, contacts 240 and 242 which are then closed, conductor 308 to the throttle closing coil 300, through fixed contacts 309 of a switch bridged by a movable contact 310 to ground at 311, which completes the circuit to the battery 299 as one side thereof is grounded at 312.

Closing the circuit through the actuating coil 239 moves the rocking bar 234 into the position shown in the drawings, so as to project the stop 227 further into the path of movement of the lever 206, and to retract the stop 228 out of the path of movement of this lever. Reciprocation of the shafts 210 and 211, which is produced by the connecting links and springs upon disengagement and engagement of the clutch, will then move the shifter bar 187 into its first speed position 1. The actuating coil 239 will be deenergized in moving the rocking bar 234 to this position, as it opens the contacts 240 and 242 of the double switch.

Further increase of speed of the vehicle causes the weights 278 to move the cam 284 axially toward the end of the shaft 282 and bring this cam into engagement with the arm 287 of the first toggle switch, swinging the arm 294 out of engagement with the fixed contact 298 and into engagement with the fixed contact 313. This completes the circuit between the battery 299 and the actuating coil 270 and the throttle closing coil 300 by a circuit including switch 301, switch 302, conductor 303, arm 294, contact 313, conductor 314, arm 315 of the second toggle switch, fixed contact 316 of the second toggle switch, conductor 317, a switch contact 318 to the actuating coil 270, conductor 319, contacts 263 and 265 of the double switch, conductor 320, conductor 308 to the throttle closing coil 300, and contacts 309 and 310 of a switch to ground at 311.

Closing the circuit through the actuating coil 270 moves the rocking bar 256 so as to project the stop 250 further into the path of movement of lever 207 and to retract the stop 249 out of the path of the movement of this lever. The movement of the rocking bar 256 also causes the upper end 273 of the cross-bar 272 to move the interlocking bar 271 to the left so as to bring both ends 276 and 276a of the cross-bar 275 into engagement with the rocking bar 234. This retains the rocking bar 234 in its mid position and projects both of the stops 227 and 228 into the path of the movement of the lever 206. Reciprocation of the shafts 210 and 211 which is produced by the connecting links and springs upon disengagement and engagement of the clutch will then move the shifter bar 187 into its neutral position N and move the shifter bar 188 into its second speed position 2. The actuating coil 270 will be deenergized in moving the rocking bar 256 to this position by the opening of contacts 263 and 265.

Upon further increase in speed of the vehicle the cam 285 will be moved by the weights 278 past the arm 321 of the second toggle switch, which is the same distance from the axis of the shaft as the arm 286, in the positions illustrated in the drawings, and will then engage the arm 322 of the second toggle switch. The arms 321 and 322 are both pivotally mounted on the shaft 288 and spaced apart by a block 323, the remainder of the switch structure being the same as the first toggle switch, so that when the cam 285 engages the arm 322 the arm 315 of the second toggle switch is moved out of engagement with the fixed contact 316 and into engagement with the fixed contact 324. The engagement of the arm 315 with the fixed contact 324 will then close a circuit between the battery 299 and the actuating coil 261. This circuit includes switch 301, switch 302, conductor 303, arm 294 of the first toggle switch, fixed contact 313 of the first toggle switch, conductor 314, arm 315, fixed contact 324 of the second toggle switch, conductor 325, arm 326 of a switch to the actuating coil 261, conductor 327, contacts 262 and 264 of the double switch associated with the rocking bar 256, conductor 320, conductor 308 to the throttle closing coil 300, and contacts 309 and 310 to ground at 311. Energizing the actuating coil 261 in this way will swing the rocking bar 256, so as to project the stop 249 into the path of movement of the lever 207, and retract the stop 250 out of the path of movement thereof, so that upon reciprocation of the lever 207 produced by the disengagement and engagement of the clutch the arm 207 will engage the stop 249 and move past the end of the stop 250 to move the shifter arm 188 from its second speed position 2 into its third speed position 3.

The swinging of the rocking bar 256 to project the stop 249 in this way will cause the other end of the rocking bar to engage the arm 274 carried by the interlocking bar and hold the arms 276 and 276a carried by the other end of the interlocking bar in engagement with rocking bar 234, so as to retain it in its mid-position and hold both of the stops 227 and 228 in the path of movement of the lever 206. Reciprocation of the lever 206 then cannot move the shifter bar 187 from its neutral position. The movement of the rocking bar 256 to project the stop 249 will deenergize the actuating coil 261, as the upper end of the rocking bar engages the operating arm 267, which opens the contacts 262 and 264 of the double switch.

In order to disengage and engage the clutch connecting the engine to the speed changing mechanism so that the gears will be shifted automatically during the interval in which the clutch is disengaged, and so that the throttle 186 will be closed to cause the engine to run at idling speed during the disengagement of the clutch and the shifting of the gears, I connect the plunger 194 to the throttle valve 186 by a link 328 and an arm 329, which is mounted on the pivoted shaft 330 connected to the throttle valve. The throttle valve 186 is urged toward its open position by a spring 331, the force of the spring 331 being transmitted by suitable linkage to the throttle operating arm 329. This linkage includes an arm 332, which is pivotally supported at 333 and connected at the lower end at 334 to a link 335. The other end of the link 335 is pivotally connected at 336 to another link 337, which is pivotally connected to the end of the throttle operating arm 329. The spring 331 is connected at one end to the arm 332 at 334, and the other end of this spring is connected at 338 to an arm 339, which is pivotally supported at 340 and normally retained in the position illustrated in the drawings. By this arrangement, the spring 331 is inclined with respect to the link 335, so that it exerts a force tending to open the throttle 186 through the linkage above described. The throttle is controlled by a foot-operated plunger 341 connected at 342 to a bell-crank lever 343. This bell-crank lever is pivotally supported by a shaft 344, which is mounted in suitable bearings. The other end of the bell-crank lever 343 is provided with a pin 345, which extends into a slot 346 in the link 337. The plunger 341 is raised by a spring 347 and normally closes the throttle 186 against the action of the spring 331. When the plungers 341 is depressed against the action of the spring 347, the pin 345 moves toward the throttle operating arm 329 and the spring 331 causes the throttle valve 186 to open. This opening movement of the throttle 186 projects the plunger 194 in the valve 192 toward the position shown in the drawings, to close the valve 192 and cut off communication between the intake manifold 185 and the power device 189 and vent the power device through the slot 194a in the valve 192 so that the pressure in the power device rises and the clutch is gradually engaged. When the plunger 341 is released the spring 347 acts through this linkage to close the throttle valve 186, so that the engine operates at idling speed; and also to retract the plunger 194, so that the opening 197 therein is in alinement with the openings 196 and 195 in the valve and the vent through the slot 194a is closed. This opens communication between the intake manifold 185 and the power device 189, which lowers the pressure in the latter, and retracts the link 198 toward the power device to disengage the clutch.

The weights 278 move the cams 284 and 285 with respect to the first and second toggle switches to shift the gears of the speed changing mechanism in accordance with the speed of the vehicle. The action of the weights 278 is modified so that the gears will be shifted at different speeds, depending on the opening of the throttle 186 when the gear shifting operation is initiated, by providing a spring 347a arranged to oppose the axial movement of the sleeve 281, and the tension of this spring is increased in proportion to the opening of the engine throttle 186 produced by depression of the foot-actuated plunger 341. I accomplish this by providing an arm 348, which is mounted on the shaft 344 connected to one end of the tension spring 347a, and the other end of this spring is connected to an arm 349, which is pivotally supported at 350 and provided with a yoke 351 engaging a groove 352 in the sleeve 281. When the foot-operated plunger 341 is depressed it acts through the bell-crank lever 343, shaft 344 and the arm 348 to increase the tension of the spring 347a, which opposes the axial movement of the sleeve 281 produced by the weights 278 through the arm 349 and the yoke 351 engaging groove 352.

Whenever the gear shifting operation is initiated it is necessary to close the engine throttle and disengage the clutch connecting the engine to the speed changing mechanism. I provide a construction utilizing the spring 331 for this purpose, which includes an arm 353 rigidly connected to the arm 339 and pivotally supported at 340. The lower end of the arm 353 is provided with a latch 354 and a movable contact 310, which in the position illustrated in the drawings, bridges the contacts 309. The latch 354 thereon is engaged by a detent 355, which is pivotally supported at 356 and provided with an armature 357 arranged adjacent the throttle closing coil 300. Whenever the circuits are completed through the actuating coils of the electrically responsive gear shifting mechanism, the actuating coils cannot effect any movement of the stops as they are engaged by the arms 206 and 207, but the circuit is completed through the throttle closing coil 300, which attracts the armature 357 and releases the detent 355 from the latch 354. The spring 331 then swings the arm 353 away from the detent into the position shown in dotted lines in Fig. 3, which opens the contacts 309 and deenergizes the actuating coils. This movement of the arm 353 moves the spring 331 into the position shown in dotted lines in Fig. 3, so that it closes the throttle 186 and opens the valve 192 to disengage the clutch. This linkage is free to move in this way to close the throttle and disengage the clutch, because the pin 345 is slidably arranged in the slot 346.

In order to return the arm 353 from the position shown in dotted lines in Fig. 3, to its position shown in full lines in Figs. 2 and 3 when the clutch is disengaged, I mount an arm 358 on the end of the shaft 200 having a roller 358a arranged in the path of movement of the arm 353, which is engaged by the arm 353 when the latch 354 is released, as shown in dotted lines in Fig. 3 of the drawings. This arm 358 is shown in Fig. 2 in its position when the clutch is engaged, so that when the arm 353 is released and swings into engagement with the roller 358a the throttle 186 is closed and the power device 189 is actuated to disengage the clutch. Upon movement of the link 198 to disengage the clutch, the arm 358 swings toward the detent 355, and after the clutch is disengaged moves arm 353, so that the detent 355 engages the latch 354, and the movable contact 310 will bridge the contacts 309 to complete the circuit to an actuating coil of the electrically responsive gear shifting mechanism. As the clutch is disengaged when the contacts 309 close in this way, the arms 206 and 207 will be swung away from the stops 227, 228, and 249 and 250 respectively, so that the actuating coil can act on the rocking bar 234 or 256 to place the stops in the position to engage the desired gear of the speed changing mechanism. Restoring the arm 353 to the position shown in the drawings will cause the spring 331 to reopen the throttle 186 and close the valve 192 so as to operate the engine at the same throttle opening at which it was operated prior to the initiation of the gear shifting operation, and also engage the clutch. The opening of the throttle 186 in this way and reengaging the clutch will take place after the gears are shifted by the reciprocatory movement of the levers 206 and 207.

When it is desired to move the shifter bar 187 into its reverse position R the switch 302 is moved into engagement with a fixed contact 359. This energizes the actuating coil 248 from the battery 299 by a circuit including conductor 360, 361, contacts 241 and 243 of the double switch associated with the rocking bar 234, conductor 308 to the throttle closing coil 300, and contacts 309 to ground at 311, which completes the circuit to the battery 299, as one side thereof is grounded at 312. The other actuating coils of the gear shifting mechanism will be disconnected from the battery by moving the switch 302 into engagement with the contact 359, and the vehicle can be operated by engaging and disengaging the clutch by the foot-pedal 201, or by actuation of the foot-operated plunger 341. After the operation in reverse is completed, the switch 302 is moved out of engagement with the contact 359, and into a position to close the circuit to the toggle switches through conductor 303, and thereby restore automatic operation of the system.

The connection between the speed changing mechanism and the rear wheels includes an overrunning or "free-wheeling" clutch, which is controlled by the wire 362 connected to an operating button 363 arranged within convenient reach of the operator of the vehicle. Under some conditions it may be desirable to actuate the clutch by a foot pedal 201 and control the shifting of gears manually, for example, in using the engine to retard the vehicle in descending a grade. In using manual control it is necessary to disconnect the centrifugally actuated toggle switches from the battery, cut off communication between manifold 185 of the engine and the power device 189, and also lock the overrunning or free-wheeling clutch. I accomplish this by providing wires 364 and 365 connecting the operating button 363 with the switch 301 and plunger 193 respectively. By pulling upwardly on the button 363 the operator can simultaneously open the switch 301, lock the free-wheeling clutch and retract the plunger 193 to close the valve 192. The operator can then shift the gears as desired by actuating the switch arm 366, which is associated with fixed contacts 367, 368, and 369. The circuit between these fixed contacts and the actuating coils of the electrically controlled gear shifting mechanism is completed through contacts 370, 371, and 372, and the movable contacts 318, 305, and 326, which are interconnected by a bar 373, and which are brought into engagement with the contacts 370, 371, and 372 when manual control is desired. The circuit between the switch arm 366 and the battery required to energize the actuating coils of the gear shifting mechanism is completed by conductor 374. In resuming automatic operation of the system the arm 373 is depressed to the position shown in the drawings, which connects the toggle switches to the actuating coils of the gear shifting mechanism, and the button 363 is depressed to close the switch 301, release the overrunning clutch connected to the wire 362, and project the plunger 193 into the position shown in the drawings to place the clutch under the control of the plunger 194.

The operation of the power system shown in Fig. 2 will now be described. In the relation of the elements of the power system shown in Fig. 2 of the drawings, the vehicle is operating at slow speed with partially open throttle in first speed. As the vehicle increases in speed the weights 278 will move the cam 284 axially toward the end of the shaft 282 until it engages the arm 287, and moves the arm 294 of the toggle switch into engagement with the contact 313. This will complete a circuit between the battery 299, the actuating coil 270, and the throttle closing coil 300, so as to retract the armature 357, raise the detent 355, and release the arm 353. The arm 353 will then swing under the action of the spring 331 away from the detent 355 and into engagement with the roller 358a, as shown in dotted lines in Fig. 3 of the drawings. This movement of the arm 353 opens the contacts 309, and thereby deenergizes the throttle closing coil 300 and the actuating coil 270. The initial energization of the actuating coil 270 will not move the rocking bar 256, because the lever 207 is in engagement with the stops 249 and 250. The swinging of the arm 353 into engagement with the roller 358a will cause the spring 331 to close the throttle valve 186 and open the valve 192 to disengage the clutch. Disengaging the clutch will swing the arms 206 and 207 against the action of the tension springs 217 and 220 away from the stops 227, 228, 249, and 250, and cause the arm 358 to swing the arm 353 into the position shown in Fig. 2 of the drawings in engagement with the detent 355. The movable contact 310 carried by the arm 353 will then bridge the contacts 309 and reclose the circuit through the throttle closing coil 300 and the actuating coil 270. As the arms 206 and 207 will then be out of engagement with the stops 227, 228, 249, and 250, the actuating coil 270 will swing the rocking bar 256, so that it projects the stop 250 and retracts the stop 249 out of the path of movement of the lever 207. The upper end of the rocking bar 256 will also engage the arm 273 carried by the interlocking bar 271 so as to bring the arms 276 and 276a into engagement with the rocking bar 234 and retain it in its mid-position with the stops 227 and 228 both in the path of movement of the lever 206. This movement of the rocking bar 256 will also engage it with the operating arm 268, thereby opening the contacts 263 and 265 and deenergizing the actuating coil 270 and the throttle closing coil 300. The detent 355 will then engage the latch 354 and retain the arm 353 in the position illustrated in the drawings. In this position of the arm 353 the spring 331 reopens the throttle valve 186 and closes the valve 192, so that the clutch will be engaged and the arm 358 restored to the position shown in the drawings. During this engagement of the clutch, the spring 217 will first cause the arm 206 to engage the stop 228 and move the shifter bar 187 from its first speed to its neutral position, and when the shifter bar reaches its neutral position the upper end of the arm 206 will engage the stop 227 to retain the shifter bar 187 in its neutral position. When the shifter bar 187 has reached its neutral position the lever 207 will engage the stop 250, and after the shifter bar 187 reaches its neutral position the lever 207 will swing past the stop 249, so as to move the shifter bar 188 into its second speed position 2. The above-described movements of the levers 206 and 207, to effect movement of the shifter bar 187 into its neutral position, and movement of the shifter bar 188 into its second speed position will take place before the reengagement of the clutch. The clutch will then reengage and the vehicle will operate in second speed.

Upon further increase in speed of the vehicle the cam 285 will pass the arm 321 and engage the arm 322, so as to move the arm 315 of the second toggle switch into engagement with the fixed contact 324. This completes a circuit between the battery 299 and the actuating coil 261 and the throttle closing coil 300, as the arm 294 of the first toggle switch will at this time be in engagement with the fixed contact 313. Upon completing this circuit the throttle closing coil 300 attracts the armature 357 and releases the arm 353, so that it swings into engagement with the roller 358a, as shown in dotted lines in Fig. 3 of the drawings, closing the throttle valve 186 and disengaging the clutch as previously described. The disengagement of the clutch will again swing the arms 206 and 207 away from the stops 227 and 228, 249 and 250, and restore the arm 353 to the position shown in Fig. 2 of the drawings, to close the contacts 309 and 310. Closing these contacts will reenergize the actuating coil 261 to project the stop 249 and retract the stop 250 out of the path of movement of the lever 207. The rocking bar 256 will, during this movement, act through the interlocking bar 271 to retain the rocking bar 234 in its mid-position in which both of the stops 227 and 228 are in the path of movement of the lever 206. In moving under the action of the actuating coil 261 the rocking bar 256 will also engage the operating arm 267 to open the contacts 262 and 264, and deenergize the actuating coil and the throttle closing coil 300. This will cause the detent 355 to engage the latch 354 and retain the lever 353 in the position illustrated in the drawings, and the throttle valve 186 will be opened and the valve 192 closed to engage the clutch. During movement of the lever to engage the clutch, the arm 206 will be acted upon by the spring 217 to engage the stops 227 and 228 and retain the shifter bar 187 in its neutral position, and the spring 220 will act on the lever 207 to engage the stop 249 and swing the lever 207 past the end of the stop 250, thereby moving the shifter bar 188 into its third speed position 3. After these levers 206 and 207 have been actuated in this way the clutch will engage and the vehicle can be operated in third speed.

If the vehicle is slowed down as in ascending a steep grade, the weights 278 will act upon the cams 284 and 285 to successively actuate the toggle switches to shift the gears into second speed, or first speed, as required, in the manner above described. Moreover, the gears will be shifted automatically as required by the operating conditions.

When the vehicle is stopped the cam 284 will engage the arm 286 of the first toggle switch and complete the circuits to the electrically controlled gear shifting mechanism to move the shifter bar 187 into its first speed position 1. The foot-operated plunger 341 will then be released and the valve 192 opened, so as to disengage the clutch, but if the engine is stopped the pressure will gradually rise in the power device 189 and engage the clutch. The engine cannot then be started without immediately transmitting power to the wheels. I therefore provide a lever 375 for moving the shifter bars 187 and 188 to their neutral position when the vehicle is stopped. The lever is pivotally supported at 376, and has a transverse pin 377 at the lower end thereof extending into slots 378 and 379 formed in the ends of the shifter bars. The lever 375 does not interfere with the shifting of the gears automatically but either of the shifter bars can be moved to its neutral position by moving the lever 375 until the pin 377 engages the end of the slot in one of the shifter bars, and moving the lever further until the pin engages the end of the slot in the other shifter bar, which will be in its neutral position.

Although I have shown particular embodiments of my improved power system as applied to a vehicle, I do not desire my invention to be limited to the particular arrangements disclosed, and I intend in the appended claims to cover all modifications which do not depart from the spirit and scope of my invention.

What I claim as new and desire to secure by Letters Patent of the United States, is:

1. A power system including a prime mover, means for controlling the torque exerted by said prime mover, a driven member, a speed changing mechanism for connecting said prime mover to said driven member, and means responsive to the speed of said driven member and modified in said response by said torque controlling means for actuating said torque controlling means to reduce the torque exerted by said prime mover and for changing the speed ratio of said speed changing mechanism.

2. A power system including a prime mover, means for controlling the torque of said prime mover, a driven member, a clutch and a speed changing mechanism for connecting said prime mover to said driven member, means responsive to actuation of said torque controlling means to reduce the torque exerted by said prime mover for disengaging said clutch and responsive to actuation of said torque controlling means to increase the torque exerted by said prime mover for engaging said clutch, and means responsive to the speed of said driven member and modified in said response by said torque controlling means for actuating said torque controlling means to reduce the torque exerted by said prime mover and disengage said clutch and for changing the speed ratio of said speed changing mechanism while said clutch is disengaged.

3. A power system including a prime mover, means for controlling the torque exerted by said prime mover, a driven member, a speed changing mechanism for connecting said driven member to said prime mover, and means responsive to the speed of said driven member and controlled in accordance with said torque controlling means for actuating said torque controlling means to decrease and then increase the torque exerted by said prime mover and for changing the speed ratio of said speed changing mechanism while the torque exerted by said prime mover is decreased.

4. A power system including a prime mover, means for controlling the torque exerted by said prime mover, a driven member, a clutch and a speed changing mechanism for connecting said prime mover to said driven member, means responsive to actuation of said torque controlling means to reduce the torque exerted by said prime mover for disengaging said clutch and responsive to actuating of said torque controlling means to increase the torque exerted by said prime mover for engaging said clutch, and means responsive to the speed of said driven member and controlled by said torque controlling means for reducing the torque exerted by said prime mover to disengage said clutch and for changing the speed ratio of said speed changing mechanism while said clutch is disengaged.

5. A power system including a prime mover, a driven member, a clutch and a speed changing mechanism for connecting said driven member to said prime mover, means for actuating said clutch to disengage and to engage the same, means for controlling the torque exerted by said prime mover, means connecting said clutch actuating means and said torque controlling means for disengaging said clutch upon actuating said torque controlling means to decrease the torque exerted by said prime mover and for engaging said clutch upon actuating said torque controlling means to increase the torque exerted by said prime mover, means controlled by said driven member for actuating said torque controlling means to decrease and then increase the torque exerted by said prime mover and for changing the ratio of said speed changing mechanism while said clutch is disengaged, and means biased to a position to disengage said clutch and to actuate said torque controlling means to decrease the torque exerted by said prime mover for actuating said torque controlling means and for varying the action of said driven member for changing the ratio of said speed changing mechanism.

6. A power system including an engine having a throttle for controlling the torque exerted thereby, a driven member, a clutch and a speed changing mechanism for connecting said driven member to said engine, means for actuating said clutch to disengage and engage the same, means connecting said throttle and said clutch actuating means for closing said throttle and disengaging said clutch and for opening said throttle and engaging said clutch, means controlled by said driven member for closing said throttle and disengaging said clutch and for changing the ratio of said speed changing mechanism while said clutch is disengaged, and means for controlling said throttle and clutch controlling means and for varying the action of said driven member in controlling the ratio of said speed changing mechanism.

7. A power system including an engine having a throttle for controlling the torque exerted thereby, a driven member, a clutch and a speed changing mechanism for connecting said driven member to said engine, means for actuating said clutch to disengage and engage the same, means including a linkage connecting said clutch actuating means and said throttle for closing said throttle and disengaging said clutch and for opening said throttle and engaging said clutch, means for controlling said throttle, a lost motion connection between said throttle controlling means and said linkage, means for biasing said throttle controlling means to a position to close said throttle and disengage said clutch, and means responsive to the speed of said driven member and modified in accordance with the opening and closing of said throttle for disengaging said clutch and for simultaneously changing the ratio of said speed changing mechanism.

8. A power system including a prime mover, means for controlling the torque exerted by said prime mover, a driven member, a clutch and a speed changing mechanism for connecting said driven member to said prime mover, means for actuating said clutch to disengage and engage the same, electrically responsive means for actuating said torque controlling means to decrease and then to increase the torque exerted by said prime mover, and electrically responsive means controlled by the actuation of said clutch controlling means for changing the ratio of said speed changing mechanism while the torque exerted by said prime mover is decreased.

9. A power system including a prime mover, means for controlling the torque exerted by said prime mover, a driven member, a clutch and a speed changing mechanism for connecting said driven member to said prime mover, means for actuating said clutch to disengage and engage the same, electrically responsive means for actuating said torque controlling means to decrease and then to increase the torque exerted by said prime mover, electrically responsive means for changing the ratio of said speed changing mechanism while the torque exerted by said prime mover is decreased, and means controlled by the actuation of said clutch for successively energizing and deenergizing said torque controlling means to close and open said throttle and for simultaneously energizing said electrically responsive means for changing the speed ratio of said speed changing mechanism.

10. A power system including a prime mover, means for controlling the torque exerted by said prime mover, a driven member, a clutch and a speed changing mechanism for connecting said driven member to said prime mover, means for controlling said clutch to disengage and engage the same, means for urging said torque controlling means to a position to increase the torque exerted by said prime mover, electrically responsive means for moving said torque controlling means to a position to decrease the torque exerted by said prime mover, electrically responsive means for changing the ratio of said speed changing mechanism, means controlled by said clutch actuating means for successively energizing and deenergizing said torque controlling means to open and close said throttle and responsive to deenergization of said torque controlling means for energizing said electrically responsive means for changing the ratio of said speed changing mechanism.

11. A power system including a prime mover, means for controlling the torque exerted by said prime mover, a driven member, clutch and a speed changing mechanism for connecting said driven member to said prime mover, means for actuating said clutch to disengage and engage the same, electrically responsive means for actuating said torque controlling means to decrease and to increase the torque exerted by said prime mover, electrically responsive means for changing the ratio of said speed changing mechanism, means for connecting said electrically responsive means in series and for energizing said means only sufficiently to actuate said torque controlling means to decrease the torque exerted by said prime mover, and means controlled by said clutch actuating means for short circuiting said torque controlling means and for increasing the energization of said means for changing the ratio of said speed changing mechanism sufficiently to actuate the same.

12. A power system including a prime mover, means for controlling the torque exerted by said prime mover, a driven member, a clutch and a speed changing mechanism for connecting said driven member to said prime mover, electrically responsive means for actuating said torque controlling means to decrease and then to increase the torque exerted by said prime mover and for simultaneously actuating said clutch to disengage and engage the same, electrically responsive means for changing the ratio of said speed changing mechanism while the torque exerted by said prime mover is decreased, and means controlled by the actuation of said clutch for successively energizing and deenergizing said torque controlling means to close and open said throttle and for simultaneously energizing said electrically responsive means for changing the speed ratio of said speed changing mechanism.

13. A power system including a prime mover, means for controlling the torque exerted by said prime mover, a driven member, a clutch and a speed changing mechanism for connecting said driven member to said prime mover, means for urging said torque controlling means to increase the torque exerted by said prime mover, electrically responsive means for moving said torque controlling means to a position to decrease the torque exerted by said prime mover and for simultaneously actuating said clutch to disengage the same, electrically responsive means for changing the ratio of said speed changing mechanism, and means controlled by the actuation of said clutch for successively energizing and deenergizing said torque controlling means to open and close said throttle and responsive to deenergization of said torque controlling means for energizing said electrically responsive means for changing said speed changing mechanism.

14. A power system including a prime mover, means for controlling the torque exerted by said prime mover, a driven member, a clutch and a speed changing mechanism for connecting said driven member to said prime mover, electrically responsive means for actuating said torque controlling means to decrease and to increase the torque exerted by said prime mover and for simultaneously actuating said clutch to disengage and engage the same, electrically responsive means for changing the ratio of said speed changing mechanism, means for connecting said electrically responsive means in series and for energizing said means only sufficiently to actuate said torque controlling means to decrease the torque exerted by said prime mover, and means controlled by the actuating of said clutch for short circuiting said torque controlling means and for increasing the energization of said means for changing the ratio of said speed changing mechanism sufficiently to actuate the same.

15. A power system including a prime mover, means for controlling the torque exerted by said prime mover, a driven member, a clutch and a speed changing mechanism for connecting said driven member to said prime mover, electrically responsive means for actuating said torque controlling means to decrease and then increase the torque exerted by said prime mover and for simultaneously actuating said clutch to disengage and engage the same, and electrically responsive means controlled by said driven member and the actuation of said clutch for changing the ratio of said speed changing mechanism while the torque exerted by said prime mover is decreased.

16. A power system including a prime mover, means for controlling the torque exerted by said prime mover, a driven member, a clutch and a speed changing mechanism for connecting said driven member to said prime mover, electrically responsive means for actuating said torque controlling means to decrease and to increase the torque exerted by said prime mover and for simultaneously actuating said clutch to disengage and engage the same, electrically responsive means for changing the ratio of said speed changing mechanism, means for connecting said electrically responsive means in series and for energizing said means only sufficiently to actuate the said torque controlling means to decrease the torque exerted by said prime mover, and means responsive to the speed of said driven member and controlled by the actuation of said clutch for short circuiting said torque controlling means and for increasing the energization of said means for changing the ratio of said speed changing mechanism sufficiently to actuate the same.

17. A power system including a prime mover, means for controlling the torque exerted by said prime mover, a driven member, a clutch and a speed changing mechanism for connecting said driven member to said prime mover, means for actuating said clutch to disengage and engage the same, said speed changing mechanism including a shifter bar for changing the ratio of said speed changing mechanism, electrically responsive means for actuating said shifter bar, electrically responsive means for latching and releasing said electrically responsive means for actuating said shifter bar, and means responsive to the speed of said driven member and controlled by said torque controlling means for energizing and deenergizing said electrically responsive means.

18. A power system including a prime mover, means for controlling the torque exerted by said prime mover, a driven member, a clutch and a speed changing mechanism for connecting said driven member to said prime mover, means for actuating said clutch to disengage and engage the same, said speed changing mechanism including a shifter bar for changing the ratio of said speed changing mechanism, electrically responsive means for actuating said shifter bar, means including electrically responsive means for latching and releasing said electrically responsive means for actuating said shifter bar, means for energizing and deenergizing said electrically responsive means for actuating said shifter bar and for energizing and deenergizing said means for releasing said latch, and means for damping the movement of said means for actuating said shifter bar and for engaging said latch, upon deenergizing said electrically responsive means.

19. A power system including a prime mover, means for controlling the torque exerted by said prime mover, a driven member, a clutch and a speed changing mechanism for connecting said driven member to said prime mover, means for actuating said clutch to disengage and engage the same, said speed changing mechanism including a shifter bar for changing the ratio of said speed changing mechanism, electrically responsive means resiliently connected to said shifter bar for actuating the same, and electrically responsive means for latching and releasing said electrically responsive means for actuating said shifter bar.

20. A power system including a prime mover, means for controlling the torque exerted by said prime mover, a driven member, a clutch and a speed changing mechanism for connecting said driven member to said prime mover, means for actuating said clutch to disengage and engage the same, said speed changing mechanism including a shifter bar for changing the ratio of said speed changing mechanism, electrically responsive means resiliently connected to said shifter bar for actuating the same, electrically responsive means for latching and releasing said electrically responsive means for actuating said shifter bar, and means responsive to the speed of said driven member and controlled by said torque controlling means for energizing and deenergizing said electrically responsive means.

21. A power system including a prime mover, means for controlling the torque exerted by said prime mover, a driven member, a clutch and a gear shifting mechanism for connecting said driven member to said prime mover, means for actuating said clutch to disengage and engage the same, said gear shifting mechanism including a shifter bar movable to a neutral and a gear engaging position for changing the ratio of said gear shifting mechanism, and electrically responsive means resiliently connected to said shifter bar for moving the gears of said gear shifting mechanism into engagement with each other.

22. A power system including a prime mover, means for controlling the torque exerted by said prime mover, a driven member, a clutch and a gear shifting mechanism for connecting said driven member to said prime mover, means for actuating said clutch to disengage and engage the same, said gear shifting mechanism including a shifter bar movable to neutral and gear engaging positions for changing the ratio of said gear shifting mechanism, electrically responsive means resiliently connected to said shifter bar for moving the gears of said gear shifting mechanism into engagement with each other, and electrically responsive means for releasing and latching said means for moving the gears of said gear shifting mechanism.

23. A power system including a prime mover, means for controlling the torque exerted by said prime mover, a driven member, a clutch and a gear shifting mechanism for connecting said driven member to said prime mover, means for actuating said clutch to disengage and engage the same, said gear shifting mechanism including a shifter bar movable to neutral and gear engaging positions for changing the ratio of said gear shifting mechanism, a guide rod engaging said shifter bar, a spring arranged on said guide rod, and electrically responsive means arranged to engage said spring for resiliently urging said shifter bar from one position to another.

24. A power system including a prime mover, means for controlling the torque exerted by said prime mover, a driven member, a clutch and a gear shifting mechanism for connecting said driven member to said prime mover, means for actuating said clutch to disengage and engage the same, said gear shifting mechanism including a shifter bar movable to neutral and gear engaging positions for changing the ratio of said gear shifting mechanism, a guide rod engaging said shifter bar, a spring arranged on said guide rod, electrically responsive means arranged to engage said spring for resiliently urging said shifter bar from one position to another, and electrically responsive means for latching and releasing said electrically responsive means for urging said shifter bar.

25. A power system including a prime mover, means for controlling the torque exerted by said prime mover, a driven member, a clutch and a gear shifting mechanism for connecting said driven member to said prime mover, means for actuating said clutch to disengage and engage the same, said gear shifting mechanism including a shifter bar movable to neutral and gear engaging positions for changing the ratio of said gear shifting mechanism, a guide rod engaging said shifter bar, a spring arranged on said guide rod, electrically responsive means arranged to engage said spring for resiliently urging said shifter bar from one position to another, and electrically responsive means for latching and releasing said electrically responsive means for urging said shifter bar and for moving said shifter bar to a neutral position.

26. A power system including a prime mover, means for controlling the torque exerted by said prime mover, a driven member, a clutch and a gear shifting mechanism for connecting said driven member to said prime mover, means for actuating said clutch to disengage and engage the same, said gear shifting mechanism including a shifter bar movable to neutral and gear engaging positions for changing the ratio of said gear shifting mechanism, a guide rod engaging said shifter bar, a spring arranged on said guide rod, electrically responsive means arranged to engage said spring for resiliently urging said shifter bar from one position to another, electrically responsive means for latching and releasing said electrically responsive means for urging said shifter bar and for moving said shifter bar to a neutral position, means for energizing and deenergizing said electrically responsive means, and means for damping the movement of said electrically responsive means for urging said shifter bar sufficiently to engage said latch upon deenergization of said electrically responsive means.

27. A power system including a prime mover, means for controlling the torque exerted by said prime mover, a driven member, a clutch and a gear shifting mechanism for connecting said driven member to said prime mover, electrically responsive means for actuating said clutch to disengage and engage the same and for coincidently actuating said torque controlling means to decrease and then increase the torque exerted by said prime mover, said gear shifting mechanism including a shifter bar movable to neutral and gear engaging positions for changing the ratio of said gear shifting mechanism, a guide rod engaging said shifter bar, a spring arranged on said guide rod, electrically responsive means arranged to engage said spring for resiliently urging said shifter bar from one position to another, electrically responsive means for latching and releasing said electrically responsive means for urging said shifter bar and for moving said shifter bar to a neutral position, means controlled by the actuation of said clutch and said torque controlling means for energizing and deenergizing said electrically responsive means, and means for damping said electrically responsive means for urging said shifter bar sufficiently to engage said latch upon deenergization of said electrically responsive means.

28. A power system including a prime mover, means for controlling the torque exerted by said prime mover, a driven member, a clutch and a gear shifting mechanism for connecting said driven member to said prime mover, electrically responsive means for actuating said clutch to disengage and engage the same and for coincidently actuating said torque controlling means to decrease and then increase the torque exerted by said prime mover, said gear shifting mechanism including a shifter bar movable to neutral and gear engaging positions for changing the ratio of said gear shifting mechanism, a guide rod engaging said shifter bar, a spring arranged on said guide rod, electrically responsive means arranged to engage said spring for resiliently urging said shifter bar from one position to another, electrically responsive means including a pivotally supported neutralizing finger to engage said shifter bar and a latch carried thereby for latching and releasing said electrically responsive means for urging said shifter bar and for moving said shifter bar to a neutral position, and means controlled by said torque controlling means and including a centrifugal mechanism and cams connected to said driven member for energizing and deenergizing said electrically responsive means.

29. A power system including a prime mover, means for controlling the torque exerted by said prime mover, a driven member, a clutch and a gear-shifting mechanism for connecting sa'd prime mover to said driven member, said gear-shifting mechanism including a plurality of levers movable from a neutral to a gear-engaging position, each of said levers having a pivotal connection intermediate the ends thereof, means for reciprocating said pivotal connections and for coincidentally disengaging and engaging said clutch, each of said levers having stops arranged on opposite sides of its pivotal connection and in the path of movement of said lever, means interconnecting said stops and associated with each of said levers for retracting one of said stops out of the path of movement of said lever and advancing the other with respect to the path of the movement of said lever, said stops being arranged in such relation to the path of movement of said levers as to move one of said levers to a neutral position before any other of said levers is moved to a gear-engaging position, means for interlocking the said stops to prevent movement of all except one of said levers to a gear-engaging position, and means including electromagnets associated with said means interconnecting said stops for actuating said stops, said last mentioned means being controlled by said driven member and said torque controlling means.

30. A power system including a prime mover, means for controlling the torque exerted by said prime mover, a driven member, a clutch and a speed changing mechanism for connecting said prime mover to said driven member, means for decreasing and then increasing the torque exerted by said prime mover and for coincidentally actuating said clutch to disengage and engage the same, means including a linkage connecting said clutch actuating means and said speed changing mechanism for changing the ratio of the latter while said clutch is disengaged, said last mentioned means being controlled by said driven member and said torque controlling means.

31. A power system including an engine having a throttle for controlling the torque exerted thereby, a driven member, a clutch and a speed changing mechanism for connecting said prime mover to said driven member, means for disengaging and engaging said clutch and coincidently closing and opening said throttle, means including a lever and spring for urging said throttle toward an open position, means biased to a position to close said throttle for controlling the same, means for releasing said lever and spring to close said throttle and disengage said clutch, means associated with said clutch connecting means for restoring said lever and spring to a position in which it tends to open said throttle and engage said clutch, and means controlled by the actuation of said lever for changing the ratio of said speed changing mechanism while said clutch is disengaged.

32. A power system including a prime mover, means for controlling the torque exerted by said prime mover, a driven member, a clutch and a speed changing mechanism for connecting said prime mover to said driven member, means for actuating said clutch to disengage and engage the same, means including a lever and spring tending to actuate said torque controlling means to increase the torque exerted by said prime mover, means including said lever and spring for biasing said torque controlling means to a position to decrease the torque exerted by said prime mover, and means controlled by said clutch actuating means for changing the ratio of said speed changing mechanism while said clutch is disengaged and for restoring said lever and spring to a position in which it tends to move said torque controlling means to a position to increase the torque exerted by said prime mover.

33. A power system including a prime mover, means for controlling the torque exerted by said prime mover, a driven member, a speed-changing mechanism for connecting said driven member to said prime mover, means including axially adjustable cams connected to said driven member for changing the ratio of said speed-changing mechanism, and means including a centrifugal device responsive to the speed of said driven member for actuating said torque-controlling means to decrease and then increase the torque exerted by said prime mover and for axially shifting said cams to change the ratio of said speed-changing mechanism while the torque exerted by said prime mover is decreased.

34. A power system including a prime mover, means for controlling the torque exerted by said prime mover, a driven member, a speed-changing mechanism for connecting said driven member to said prime mover, electrically responsive means for changing the ratio of said speed-changing mechanism, and means responsive to an element of said power system for actuating said torque-controlling means to decrease and then increase the torque exerted by said prime mover and for changing the speed ratio of said speed-changing mechanism while the torque exerted by said prime mover is decreased, said last-mentioned means including a switch and a cooperating cam shiftable with respect to said switch and connected to said driven member for actuating said switch to change the ratio of said speed-changing mechanism.

35. A power system including a prime mover, means for controlling a torque exerted by said prime mover, a driven member, a speed changing mechanism for connecting said prime mover to said driven member, means responsive to the speed of said driven member and modified in said response by said torque controlling means for actuating said torque controlling means to reduce the torque exerted by said prime mover and for changing the speed ratio of said speed changing mechanism, and manually operable means for disconnecting and connecting in reverse said prime mover and said driven member and disconnecting said speed responsive control means.

36. A power system including a prime mover, means for controlling the torque exerted by said prime mover, a driven member, a clutch and a speed changing mechanism for connecting said driven member to said prime mover, means for actuating said clutch to disengage and engage the same, said speed changing mechanism including a shifter bar for changing the ratio of said speed changing mechanism, electrically responsive means resiliently connected to said shifter bar for actuating the same, electrically responsive means including an electrical circuit for latching and releasing said electrically responsive means for actuating said shifter bar, and manually operable means for actuating said shifter bar to a neutral and reverse driving position and for opening and closing said electrical circuit.

37. A power system including a prime mover, means for controlling the torque exerted by said prime mover, a driven member, a clutch and a gear shifting mechanism for connecting said driven member to said prime mover, means for actuating said clutch to disengage and engage the same, said gear shifting mechanism including a shifter bar movable to a neutral and a gear engaging position for changing the ratio of said gear shifting mechanism, electrically responsive means resiliently connected to said shifter bar for moving the gears of said gear shifting mechanism into engagement with each other, and manually operable means for shifting said gears to a neutral and reverse driving position.

38. A power system including a prime mover, means for controlling the torque exerted by said prime mover, a driven member, a speed changing mechanism for connecting said driven member to said prime mover, means responsive to the speed of said driven member for changing the ratio of said speed changing mechanism, means dependent upon said torque controlling means for modifying the response of said speed responsive means, and manually operable means for connecting and disconnecting said prime mover and said driven member and for disconnecting said speed responsive control means.

39. A power system including a prime mover, means for controlling the torque exerted by said prime mover, a driven member, a speed changing mechanism for connecting said driven member to said prime mover, means including axially adjustable cams connected to said driven member for changing the ratio of said speed changing mechanism, means including a centrifugal device responsive to the speed of said driven member for actuating said torque controlling means to decrease and then increase the torque exerted by said prime mover and for axially shifting said cams to change the ratio of said speed changing mechanism while the torque exerted by said prime mover is decreased, and manually operable means for controlling said speed changing mechanism and for rendering ineffective said adjustable cam operated means.

40. A power system including a prime mover, means for controlling the torque exerted by said prime mover, a driven member, a clutch and a gear shifting mechanism for connecting said driven member to said prime mover, means for actuating said clutch to disengage and engage the same, said gear shifting mechanism including a shifter bar movable to neutral and gear engaging positions for changing the ratio of said gear shifting mechanism, a guide rod engaging said shifter bar, a spring arranged on said guide rod, electrically responsive means arranged to engage said spring for resiliently urging said shifter bar from one position to another, and means operable by said guide rod for deenergizing said electrically responsive means.

41. A power system having a prime mover and a driven member, means for controlling the torque of said prime mover, means for connecting said prime mover and said driven member, electrically responsive means for controlling said connecting means, and means modified by said torque controlling means for energizing and deenergizing said electrically responsive means at different speeds of said driven member.

42. A power system having a prime mover and a driven member, means for controlling the torque of said prime mover, means for connecting said prime mover and said driven member, electrically responsive means including a plurality of normally open circuits for controlling said connecting means, means operated by said driven member for selectively controlling the opening and closing of said circuits, and means controlled by said torque controlling means for modifying the operation of said circuit controlling means.

43. A power system including a prime mover, means for controlling the torque exerted by said prime mover, a driven member, a clutch and a speed changing mechanism for connecting said driven member to said prime mover, means for controlling said clutch to disengage and engage the same, means for urging said torque controlling means to a position to increase the torque exerted by said prime mover, electrically responsive means for moving said torque controlling means to a position to decrease the torque exerted by said prime mover, means for changing the ratio of said speed changing mechanism, and means controlled by said driven member and said clutch actuating means for successively energizing and deenergizing said torque controlling means to open and close said throttle and responsive to deenergization of said torque controlling means for energizing said electrically responsive means for changing the ratio of said speed changing mechanism.

44. A power system including a prime mover, means for controlling the torque exerted by said prime mover, a driven member, a clutch and a gear shifting mechanism for connecting said driven member to said prime mover, means including electrically responsive means for actuating said clutch to disengage and engage the same and for coincidentally actuating said torque controlling means to decrease and then increase the torque exerted by said prime mover, said gear shifting mechanism including a shifter bar movable to neutral and gear engaging positions for changing the ratio of said gear shifting mechanism, a guide rod engaging said shifter bar, a spring arranged on said guide rod, electrically responsive means arranged to engage said spring for resiliently urging said shifter bar from one position to another, electrically responsive means including a pivotally supported neutralizing finger to engage said shifter bar and a latch carried thereby to latch and release said electrically responsive means for urging said shifter bar and for moving said shifter bar to a neutral position, means controlled by said torque controlling means and responsive to the speed of said driven member for energizing and deenergizing said electrically responsive means, and means for damping said electrically responsive means for urging said shifter bar sufficiently to engage said latch upon deenergization of said electrically responsive means.

DAVID C. PRINCE.

DISCLAIMER 2,062,104.—*David C. Prince*, Swarthmore, Pa. POWER SYSTEM. Patent dated November 24, 1936. Disclaimer filed April 26, 1940, by the assignee, *General Electric Company*.

Hereby enters this disclaimer of claim 38 of said patent.

[*Official Gazette May 21, 1940.*]

thereby to latch and release said electrically responsive means for urging said shifter bar and for moving said shifter bar to a neutral position, means controlled by said torque controlling means and responsive to the speed of said driven member for energizing and deenergizing said electrically responsive means, and means for damping said electrically responsive means for urging said shifter bar sufficiently to engage said latch upon deenergization of said electrically responsive means.

DAVID C. PRINCE.

DISCLAIMER 2,062,104.—*David C. Prince*, Swarthmore, Pa. POWER SYSTEM. Patent dated November 24, 1936. Disclaimer filed April 26, 1940, by the assignee, *General Electric Company*.

Hereby enters this disclaimer of claim 38 of said patent.

[*Official Gazette May 21, 1940.*]

DISCLAIMER 2,062,104.—*David C. Prince*, Swarthmore, Pa. POWER SYSTEM. Patent dated November 24, 1936. Disclaimer filed April 26, 1940, by the assignee, *General Electric Company*.

Hereby enters this disclaimer of claim 38 of said patent.

[*Official Gazette May 21, 1940.*]